US011876831B2

(12) United States Patent
Maeda et al.

(10) Patent No.: US 11,876,831 B2
(45) Date of Patent: Jan. 16, 2024

(54) DDOS COPING APPARATUS, DDOS COPING METHOD AND PROGRAM

(71) Applicant: Nippon Telegraph and Telephone Corporation, Tokyo (JP)

(72) Inventors: Hiroaki Maeda, Tokyo (JP); Hisashi Kojima, Tokyo (JP); Yoshiko Sueda, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 363 days.

(21) Appl. No.: 16/968,984

(22) PCT Filed: Feb. 12, 2019

(86) PCT No.: PCT/JP2019/004911
§ 371 (c)(1),
(2) Date: Aug. 11, 2020

(87) PCT Pub. No.: WO2019/159907
PCT Pub. Date: Aug. 22, 2019

(65) Prior Publication Data
US 2021/0058427 A1 Feb. 25, 2021

(30) Foreign Application Priority Data
Feb. 13, 2018 (JP) .................................. 2018-023388

(51) Int. Cl.
*H04L 9/40* (2022.01)
*H04L 45/021* (2022.01)
(52) U.S. Cl.
CPC ........ *H04L 63/1458* (2013.01); *H04L 45/021* (2013.01); *H04L 63/1416* (2013.01)

(58) Field of Classification Search
CPC . H04L 45/021; H04L 47/125; H04L 63/1416; H04L 63/1458; H04L 67/1034; H04L 67/55; H04L 67/562
See application file for complete search history.

(56) References Cited

U.S. PATENT DOCUMENTS 9,794,281 B1* 10/2017 Radlein ............... H04L 63/1458
2004/0148520 A1* 7/2004 Talpade ............... H04L 63/0227
726/22

(Continued)

OTHER PUBLICATIONS

Arbornetworks.com, [online], "Powerful DDoS Protection Made Simple," 2017, retrieved on Dec. 22, 2017, retrieved from URL<https://www.arbornetworks.com/ddos-protection-products/arbor-aps>, 6 pages.

(Continued)

*Primary Examiner* — Daniel B Potratz
*Assistant Examiner* — Matthias Habtegeorgis
(74) *Attorney, Agent, or Firm* — Fish & Richardson P.C.

(57) ABSTRACT

A DDoS handling device configured to handle communication directed to a target of a DDoS attack flowing in from an adjacent autonomous system in an autonomous system provided with a plurality of mitigating locations includes: a load distribution determination unit configured to determine whether or not to execute load distribution processing on the basis of an amount of available resources at mitigating locations corresponding to a gateway device into which the communication directed to the target flows and an amount of the communication directed to the target in a case in which at least one attack has been detected; a load distribution processing unit configured to decide mitigating locations to be used to handle the communication directed to the target from among the plurality of mitigating locations to solve shortage of resources at the mitigating locations for each attack, in a case in which the load distribution determination unit determines to execute the load distribution processing;

(Continued)

and an attack handling setting unit configured to execute path control such that the communication directed to the target pertaining to the attack passes through the mitigating locations decided by the load distribution processing unit for each attack.

12 Claims, 13 Drawing Sheets

(56) References Cited

U.S. PATENT DOCUMENTS

| | | | | |
|---|---|---|---|---|
| 2006/0142010 A1* | 6/2006 | Tom | ............... | H04L 65/4038 455/445 |
| 2006/0236394 A1* | 10/2006 | Morrow | ............... | H04L 63/1458 726/23 |
| 2013/0339545 A1* | 12/2013 | Shenoi | ............... | H04L 63/1416 709/240 |
| 2014/0373146 A1* | 12/2014 | Murthy | ............... | H04L 63/1408 726/23 |
| 2016/0330236 A1* | 11/2016 | Reddy | ............... | H04L 63/1416 |
| 2017/0279685 A1* | 9/2017 | Mota | ............... | H04L 41/12 |
| 2021/0136103 A1* | 5/2021 | Nishizuka | ............... | H04L 63/1416 |

OTHER PUBLICATIONS

Level3.com, [online], "Level 2 DDoS Mitigation," 2017, retrieved on Dec. 25, 2017, retrieved from URL<http://www.level3.com/~/media/files/brochures/en_secur_br_ddos_mitigation.pdf>, 2 pages.

Mizuguchi et al., "Traffic Analysis System SAMURAI and Service Deployment," NTT Technical Journal, Jul. 2008, pp. 16-19, 10 pages (with English Translation).

Tatacommunications.com, [online], "The Power to Keep Cyber Attachs on the Back Foot," 2016, retrieved on Dec. 22, 2017, retrieved from <https://www.tatacommunications.com/wp-content/uploads/2017/06/THE-POWER-TO-KEEP-CYBER-ATTACKS-ON-THE-BACK-FOOT-1.pdf>, 2 pages.

US.ntt.com, [online], "DDoS Mitigation Services," Available no later than Feb. 13, 2018, retrieved on Dec. 22, 2017, retrieved from URL<http://www.us.ntt.com/content/dam/nttcom/us/pdf/brochure/ddos-mitigation-services.pdf>, 1 page.

* cited by examiner

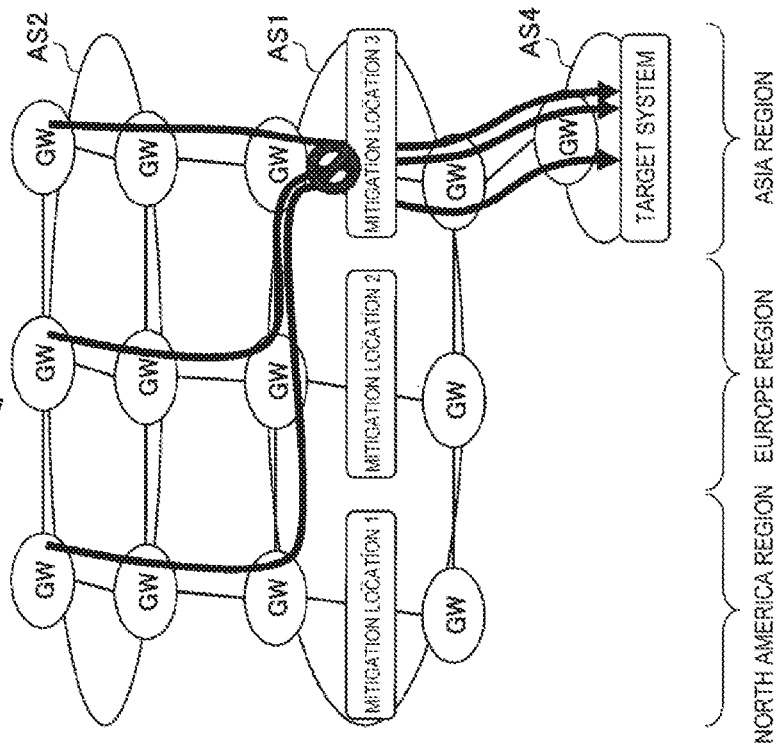
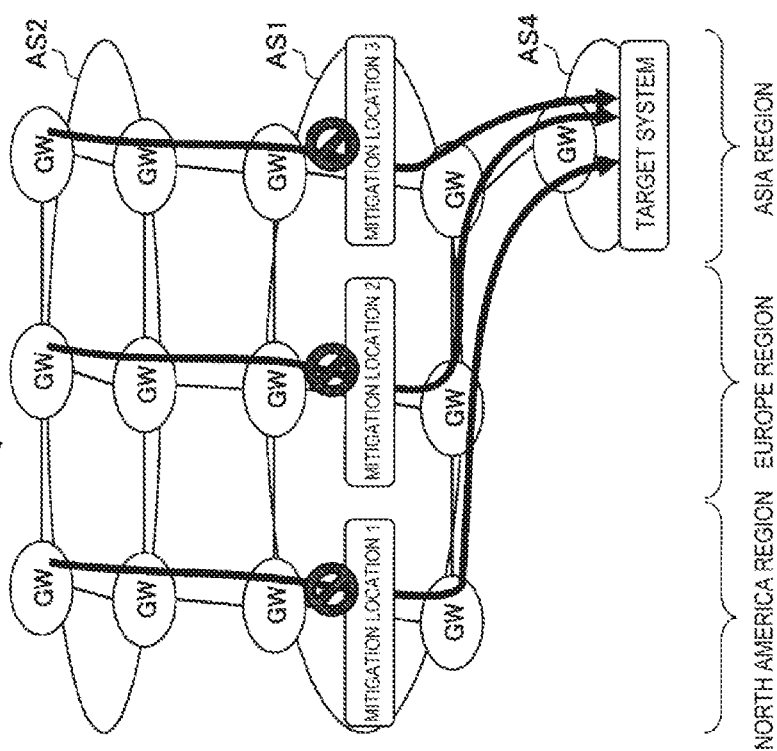

| GW NUMBER | REGION OF GW | TARGET IP ADDRESS | ADJACENT AS NUMBER OF ORIGIN OF FLOW | ADJACENT AS NUMBER OF DESTINATION OF OUTFLOW | AMOUNT OF COMMUNICATION DIRECTED TO TARGET |
|---|---|---|---|---|---|
| 5 | EUROPE | 198.51.100.3 | 5 | — | 40Gbps |
| | | 192.0.2.2 | 6 | — | 10Gbps |
| | | 198.51.100.2 | | | 20Gbps |

Fig. 7

| LOCATION NUMBER | MAXIMUM AMOUNT OF RESOURCES OF MITIGATION DEVICES | AMOUNT OF AVAILABLE RESOURCES OF MITIGATION DEVICES |
|---|---|---|
| 1 | 60Gbps | 50Gbps |
| 2 | 60Gbps | 0Gbps |
| 3 | 60Gbps | 50Gbps |

Fig. 8

| GW NUMBER | REGION OF GW | LOCATION NUMBER | REGION OF LOCATION |
|---|---|---|---|
| 1 | NORTH AMERICA | 1 | NORTH AMERICA |
| 2 | EUROPE | 2 | EUROPE |
| 3 | ASIA | 3 | ASIA |
| 4 | NORTH AMERICA | 1 | NORTH AMERICA |
| 5 | EUROPE | 2 | EUROPE |
| 6 | ASIA | 3 | ASIA |

Fig. 9

| TARGET AS NUMBER | TARGET IP ADDRESS |
|---|---|
| AS2 | 192.0.2.2 |
| AS4 | 198.51.100.2 |
| AS4 | 198.51.100.3 |

Fig. 10

| ADJACENT AS NUMBER OF ORIGIN OF FLOW | TARGET IP ADDRESS (IN UNITS OF /24) | CURRENT PATH NUMBER | CURRENT ENTRANCE INFORMATION ||||| REGION OF EXIT |
|---|---|---|---|---|---|---|---|---|
| | | | REGION 1 INFORMATION || REGION 2 INFORMATION || ... | |
| | | | REGION | AMOUNT OF COMMUNICATION DIRECTED TO TARGET | REGION | AMOUNT OF COMMUNICATION DIRECTED TO TARGET | | |
| 5 | 192.0.2.0/24 | 1 | NORTH AMERICA | 10Gbps | - | - | ... | NORTH AMERICA |
| 5 | 198.51.100.0/24 | 1 | EUROPE | 40Gbps | ASIA | 10Gbps | ... | ASIA |
| 6 | 192.0.2.0/24 | 1 | EUROPE | 10Gbps | - | - | ... | NORTH AMERICA |
| 6 | 198.51.100.0/24 | 1 | EUROPE | 20Gbps | - | - | ... | ASIA |

Fig. 11

| ADJACENT AS NUMBER OF ORIGIN OF FLOW | TARGET IP ADDRESS (IN UNITS OF /24) | PATH NUMBER | ENTRANCE INFORMATION ||||||||
| --- | --- | --- | --- | --- | --- | --- | --- | --- | --- | --- |
| | | | REGION 1 INFORMATION ||| REGION 2 INFORMATION ||| REGION 3 INFORMATION |||
| | | | REGION | AMOUNT OF COMMUNICATION DIRECTED TO TARGET | LOCATION NUMBER | REGION | AMOUNT OF COMMUNICATION DIRECTED TO TARGET | LOCATION NUMBER | REGION | AMOUNT OF COMMUNICATION DIRECTED TO TARGET | LOCATION NUMBER |
| 5 | 192.0.2.0/24 | 1 | NORTH AMERICA | 10Gbps | 1 | EUROPE | 0Gbps | 2 | ASIA | 0Gbps | 3 |
| 5 | 198.51.100.0/24 | 1 | NORTH AMERICA | 0Gbps | 1 | EUROPE | 40Gbps | 2 | ASIA | 10Gbps | 3 |
| 6 | 192.0.2.0/24 | 1 | NORTH AMERICA | 0Gbps | 1 | EUROPE | 10Gbps | 2 | ASIA | 0Gbps | 3 |
| 6 | 198.51.100.0/24 | 1 | NORTH AMERICA | 0Gbps | 1 | EUROPE | 20Gbps | 2 | ASIA | 0Gbps | 3 |

Fig. 12

| ADJACENT AS NUMBER OF ORIGIN OF FLOW | TARGET IP ADDRESS (IN UNITS OF /24) | PATH NUMBER | REGION OF ENTRANCE | REGION OF EXIT | LOCATION NUMBER | AMOUNT OF COMMUNICATION DIRECTED TO TARGET |
|---|---|---|---|---|---|---|
| 5 | 192.0.2.0/24 | 2 | NORTH AMERICA | NORTH AMERICA | 1 | 10Gbps |
| 5 | 198.51.100.0/24 | 2 | ASIA | ASIA | 3 | 50Gbps |
| 6 | 192.0.2.0/24 | 2 | NORTH AMERICA | NORTH AMERICA | 1 | 10Gbps |
| 6 | 198.51.100.0/24 | 2 | ASIA | ASIA | 3 | 20Gbps |

Fig. 13

| ADJACENT AS NUMBER OF ORIGIN OF FLOW | TARGET IP ADDRESS (IN UNITS OF /24) | ENTRANCE INFORMATION | | | | | |
|---|---|---|---|---|---|---|---|
| | | REGION 1 INFORMATION | | REGION 2 INFORMATION | | REGION 3 INFORMATION | |
| | | REGION | AMOUNT OF COMMUNICATION DIRECTED TO TARGET | REGION | AMOUNT OF COMMUNICATION DIRECTED TO TARGET | REGION | AMOUNT OF COMMUNICATION DIRECTED TO TARGET |
| 5 | 192.0.2.0/24 | NORTH AMERICA | 10Gbps | EUROPE | 0Gbps | ASIA | 0Gbps |
| 5 | 198.51.100.0/24 | NORTH AMERICA | 0Gbps | EUROPE | 40Gbps | ASIA | 10Gbps |
| 6 | 192.0.2.0/24 | NORTH AMERICA | 0Gbps | EUROPE | 10Gbps | ASIA | 0Gbps |
| 6 | 198.51.100.0/24 | NORTH AMERICA | 0Gbps | EUROPE | 20Gbps | ASIA | 0Gbps |

Fig. 14

DDOS COPING APPARATUS, DDOS COPING METHOD AND PROGRAM

CROSS-REFERENCE TO RELATED APPLICATIONS

This application is a National Stage application under 35 U.S.C. § 371 of International Application No. PCT/JP2019/004911, having an International Filing Date of Feb. 12, 2019, which claims priority to Japanese Application Serial No. 2018-023388, filed on Feb. 13, 2018. The disclosure of the prior application is considered part of the disclosure of this application, and is incorporated in its entirety into this application

TECHNICAL FIELD

The present invention relates to network technologies that implement handling of distributed denial of service attacks (DDoS attacks).

BACKGROUND ART

Currently, global autonomous systems (ASs) that run worldwide networks such as Tier1 Internet service providers (ISPs) provide DDoS countermeasure services for their customers (such as ISPs and companies that have signed transit contracts). According to the services, a plurality of mitigation locations (one or more mitigation devices described in NPL 1 or the like are placed at each location) are distributed and deployed globally, and handling using location resources near origins of attacks (handling conducted by drawing communication directed to a target to a location that is closest to each origin of attack) is conducted using technologies such as IP anycast in view of delay/consumption bands (NPL 2 to 4).

Note that targeted communication that is drawn to a location includes both communication (normal communication) generated by a normal user and communication (an attack) generated by an attack terminal such as bot, and denial of service is prevented by blocking only the attack communication and transferring the normal communication to an original destination through detailed inspection performed by the mitigation devices.

CITATION LIST

Non-Patent Literature

NPL 1: Arbor Networks, "DDoS PROTECTION BY ARBOR NETWORKS APS",
NPL 2: NTT America, "DDoS Mitigation Services", [Online].
NPL 3: TATA Communications, "Internet with MDDoS for Carriers", [Online].
NPL 4: Level 3 Communications, "LEVEL 3 DDoS MITIGATION", [Online].
NPL 5: Takanori Mizuguchi et al., "Traffic analysis system SAMURAI and service deployment," NTT technology journal, 2008.7.

SUMMARY OF THE INVENTION

Technical Problem

According to the related art described in the background art, when origins of attacks are concentrated in a specific region, a load is concentrated on a mitigation location in the region, resources of mitigation devices in the location thus become insufficient (a processing performance limit of the mitigation devices, such as a throughput), and it becomes impossible to handle the situation even when there are excess location resources in other regions (mitigation device resources in the locations). To handle this problem, although distribution of a resource load among locations by setting different IP addresses for the respective locations and assigning locations to be used for the respective destinations (targets) of attacks instead of handling the problem at a location near the origin of the attack using IP anycast is also conceivable, there is a problem that in a case in which a location in a remote region that is different from an original communication path is assigned (example: a location in Asia is used for handling communication originating from and directed to North America), communication directed to the target is bypassed to the region and delay increases. Note that because a path can be changed only in units of /24 or more through a BGP between current ISPs, communication in units of /24 including a single address (/32) is bypassed to a mitigation location even in a case in which the single IP address is targeted, and normal communication is also involved in a case in which a location outside an ordinary path is selected.

The present invention was made in view of the foregoing point, and an object of the present invention is to provide a DDoS attack handling technology capable of realizing distribution of a resource load among locations while preventing an increase in delay in communication directed to a target associated with handling of a DDoS attack (while reducing the delay that is comparable to the delay achieved by the current handling).

Means for Solving the Problem

According to the disclosed technology, there is provided a DDoS handling device configured to handle communication directed to a target of a DDoS attack flowing in from at least one adjacent autonomous system in an autonomous system provided with a plurality of mitigating locations for the DDoS attack, in which the autonomous system includes a plurality of gateway devices that serve as a plurality of connection points to adjacent autonomous systems, and the mitigating locations configured to mitigate the attack pertaining to the communication directed to the target flowing in are defined in advance for the gateway devices, respective, the DDoS handling device including: a load distribution determination unit configured to determine whether or not to execute load distribution processing on the basis of an amount of available resources at mitigating locations corresponding to a gateway device into which the communication directed to the target flows and an amount of the communication directed to the target in a case in which at least one attack has been detected; a load distribution processing unit configured to decide mitigating locations to be used to handle the communication directed to the target from among the plurality of mitigating locations to solve shortage of resources at the mitigating locations for each attack, in a case in which the load distribution determination unit determines to execute the load distribution processing; and an attack handling setting unit configured to execute path control such that the communication directed to the target pertaining to the attack passes through the mitigating locations decided by the load distribution processing unit for each attack.

Effects of the Invention

According to the disclosed technology, it is possible to provide a DDoS attack handling technology capable of realizing distribution of a resource load among locations while preventing an increase in delay in communication directed to a target associated with handling of a DDoS attack (curbing the delay to a level that is comparable to a delay of current handling).

BRIEF DESCRIPTION OF DRAWINGS

FIGS. 6A and 6B are diagrams illustrating a relationship between the path when the first location is used and the path when the second location is used in a case in which traffic control for distributing a resource load between locations is carried out in an AS itself.

FIG. 7 is a diagram illustrating an example of a flow information table (that is present for each GW).

FIG. 8 is a diagram illustrating an example of a mitigation location information table.

FIG. 9 is a diagram illustrating an example of a correspondence information table between the respective GWs and locations.

FIG. 10 is a diagram illustrating an example of a target IP address information table.

FIG. 11 is a diagram illustrating an attack information table.

FIG. 12 is a diagram illustrating a first location information table for each attack.

FIG. 13 is a diagram illustrating a second location information table for each attack.

FIG. 14 is a diagram illustrating an observation amount information table at a first location.

DESCRIPTION OF EMBODIMENTS

Overview of Embodiment

Figure 1:
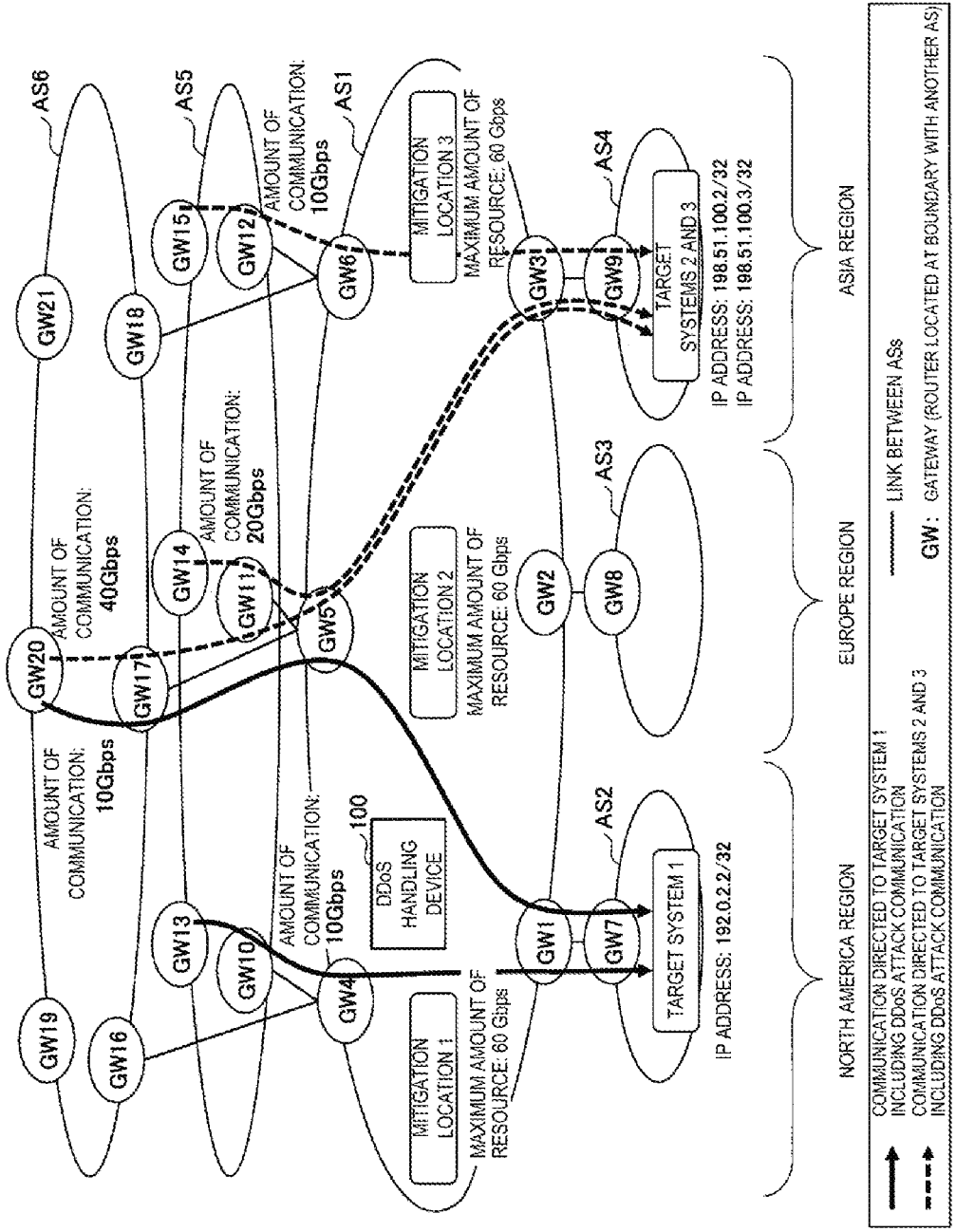
FIG. 1 is a configuration diagram of a network (the Internet) according to an embodiment of the present invention.

First, an overview of an embodiment of the present invention will be described. Hereinafter, assumptions and a processing means will be described.

Assumption

In an embodiment, an AS a target of an application contains a plurality of mitigation locations and uses different mitigation locations (performs handling at locations that are close to origins of flow) depending on each GW (a boundary router with another AS) into which communication directed to a target flows. In addition, in traffic control of the technology according to the present invention, it is assumed that there are one or more adjacent ASs that have connection points at two or more GWs in different locations when both a case in which the traffic control is carried out by changing a path in the AS itself and a case in which the traffic control is carried out by changing a path in an adjacent AS are assumed, in particular, when the traffic control is carried out by changing a path in the adjacent AS. In other words, there are one or more ASs in which a bypass path in the adjacent AS is present in a case in which communication directed to the target flows in via the adjacent AS.

In a case in which the traffic control is carried out in the adjacent AS, it is possible to switch the communication to a specific destination to either (1) hot-potato routing or (2) cold-potato routing for routing from the AS to which the technology of the present invention is applied, further using MED or the like of BGP, in the adjacent AS.

(1) The hot-potato routing is a routing scheme in which communication between ISPs passes through a connection point near an origin of transmission in a case in which ISPs are peering at a plurality of connection points. For example, communication for transferring from an adjacent AS to the AS that is the target of the application, which has flowed into the adjacent AS from Asia, is passed from a connection point in Asia that is closest to the origin of flow to the AS that is the target of the application.

(2) The cold-potato routing is a routing scheme in which a network that is close to the origin of transmission holds traffic as long as possible. For example, communication for transferring from the adjacent AS to the AS that is the target of the application, which has flowed into the adjacent AS from Asia is carried in the adjacent AS to Europe and is then passed from a connection point in Europe to the AS that is the target of the application in a case in which a destination is Europe.

Processing Means

A DDoS handling device calculating a plurality of locations that are present on one or more paths through which transferring can be carried out with a comparable delay for each communication directed to the target flowing in from each adjacent AS and calculating an optimal combination for distributing a load on mitigation device resources among the locations regarding which path is to be used to transfer each "adjacent AS that is an origin of flow+target directed" communication is introduced. Here, units of communication to be controlled are not limited to units of "adjacent AS that is the origin of flow+target directed" communication as described above, and control may be carried out in units of communication directed to the target, for example. Also, the destination of the target is assumed to be controlled in units of arbitrary IP address spaces, such as in units of /32 or in units of /24. In the following description, the case of the control in units of "adjacent AS that is the origin of flow+ target directed (/24)" communication will be described.

In a case in which location resources in a specific region are insufficient when a DDoS attack is detected, the DDoS handling device views how traffic in an initial state (in a case in which a first location is used) flows (flow information of each GW) to distinguish an exit GW, and extracts a location (second location) corresponding to the exit GW, for each "adjacent AS that is the origin of flow+destination (/24)". Also, the amount of communication for each "adjacent AS that is the origin of flow+destination" that flows into and out of the respective entrance and exit GWs (merged in units of the respective regions) is estimated. Here, in a case in which the traffic control is carried out in the adjacent AS, after distinguishing a region of exit by viewing how the traffic in the initial state flows, a path, which has an entrance in the same region as the region of the exit, through which transferring can be carried out with a delay comparable to that of the path in the initial state, along which locations to be used for the handling can be changed (a path using the second location) is calculated, and the amount of communication for each "adjacent AS that is the origin of flow+destination" flowing in from each GW (merged in units of respective regions) is estimated when the transferring is carried out through each path.

Here, by acquiring the amount and the direction (inflow or outflow) of communication directed to an arbitrary destination at each GW (using flow information and the like), how the traffic flows regarding from which GW the communication directed to the destination flows into the AS itself (the GW will be described as an entrance GW) and from which GW the communication flows out to another AS (the GW will be described as an exit GW) is dynamically recognized. In addition, region information regarding regions in which the respective GWs are placed is held in advance, and correspondence information regarding which locations are to be used to handle communication flowing in from the respective GWs is held in advance. Thus, it is possible to determine whether or not the aforementioned resources are insufficient and to estimate the amount of communication.

The DDoS handling device searches for an optimal combination capable of solving shortage of resources at each location (capable of distributing a load) from among combinations to handle each "adjacent AS of the origin of flow+destination" at either the first location or the second location.

The resource load distribution policies (objective functions of optimization) in the present embodiment are the following two policies (objective function 1, objective function 2).

Objective function 1: Not only to solve shortage of resources but to further enhance containing efficiency, a resource utilization rate at each location is maximally equalized.

Objective function 2: In consideration of not only solving shortage of resources but influences on communication associated with a change in path, the number of communications directed to the target necessary to change the path from the current path is minimized.

The DDoS handling device uses the location information corresponding to the entrance and the amount of communication directed to the target for each adjacent AS flowing through the entrance (the entrance of each of a plurality of present paths in a case in which traffic control is carried out in the adjacent AS) and the exit to calculate how many resources at the respective locations are used to handle each attack at the first location and the second location and obtains a solution through full search or by constructing an optimization problem, thereby searching for a combination of paths of each "adjacent AS of the origin of flow+destination" that meets the objective function.

Also, the DDoS handling device changes the path of communication of the "adjacent AS of the origin of flow+destination" requiring switching to handling at a location that is different from the current location (requiring a change from the current path) to a path via desired locations.

In a case in which the traffic control is carried out in the adjacent AS, handling is carried out by issuing advertisement of path information pertaining to the communication (BGP path) for the adjacent AS, thus asking the adjacent AS to change the path to a desired path, then controlling the GWs and the like in the AS itself (using the BGP path advertisement+anycast routing or the like), thereby drawing the communication of the "adjacent AS of the origin of flow+destination" to the location corresponding to the entrance GW. In a case in which the traffic control is carried out in the AS itself, the handling is carried out by drawing out the communication into the location corresponding to the entrance GW using the BGP and the anycast routing or the like when arbitrary communication of the "adjacent AS of the origin of flow+destination" is handled at the first location, and the communication is drawn into the location corresponding to the exit GW by changing an IP address unique to an arbitrary location to a destination of the communication when the handling is carried out at the second location.

As described above, an increase in delay in the communication directed to the target is prevented, and also distribution of a resource load among locations is realized.

Hereinafter, an embodiment of the present invention (present embodiment) will be more specifically described with reference to drawings. The embodiment described below is merely an example, and the embodiment to which the present invention is applied is not limited to the following embodiment.

In the following embodiment, a DDoS handling device 100 configured to calculate locations that are present on one or more transfer paths, through which transfer can be carried out with comparable delays, for each communication directed to a target flowing in from each adjacent autonomous system (hereinafter, referred to as an AS) and calculate an optimal combination regarding which locations are to be used to handle each communication directed to the target to distribute a load of mitigation device resources among the locations will be disclosed.

Network Configuration

FIG. 1 illustrates a configuration example of a network (the Internet) according to an embodiment of the present invention. As illustrated in FIG. 1, an arbitrary number of ASs (such as an AS 1 to an AS 6) are included in the network, and the ASs are interconnected to form a network topology of the network that imitates the Internet.

In the present embodiment, an AS 1, an AS 5, and an AS 6 represent global scale ASs, such as Tier 1 ISP, while an AS 2, an AS 3, and an AS 4 represent Tier 2, and Tier 3 ISPs that have signed transit contracts with the AS 1 and an AS to which a company belongs.

Also, a GW 1, a GW 4, a GW 7, a GW 10, a GW 13, a GW 16, a GW 19, and a mitigation location 1 represent facilities in North America region, a GW 2, a GW 5, a GW 8, a GW 11, a GW 14, a GW 17, a GW 20, and a mitigation location 2 represent facilities in the Europe region, and a GW 3, a GW 6, a GW 9, a GW 12, a GW 15, a GW 18, a GW 21, and a mitigation location 3 represent facilities in the Asia region. In addition, the present embodiment is described on the assumption that intra-AS and inter-AS path control is carried out through the BGP, a GW 4 and a GW 10, a GW 4 and a GW 16, a GW 5 and a GW 11, a GW 5 and a GW 17, a GW 6 and a GW 12, a GW 6 and a GW 18, a GW 1 and a GW 7, a GW 2 and a GW 8, and a GW 3 and a GW 9 constitute eBGP peers, respectively, and GWs in each AS constitute an iBGP peer.

In the present embodiment, a situation in which the AS 1 provides DDoS handling services as described in the background art to the AS 2, the AS 3, and the AS 4, which are customers of the AS 1 itself and further carries the DDoS handling device 100 according to the invention is assumed. As an example, a case in which systems 1 to 3 in the AS 2 and the AS 4 have become targets of DDoS attacks is assumed, and a case in which traffic directed to each target has passed through the AS 1 through paths represented by the solid line and the dashed line in FIG. 1 as a default path will be described.

The default path is described on the assumption that hot-potato routing is carried out in the AS 5 and the AS 6 on an upstream side. The hot-potato routing is a form of routing in which communication between ASs passes through connection points that are close to an origin of transmission in a case in which the ASs (ISP and the like) are interconnected at a plurality of connection points. For example, in a case in which communication directed to the AS 4 originating from the Europe region in the AS 5 is transferred to the AS 1, the communication is transferred from connection points (GW 11→GW 5) in the Europe region that are the closest to the origin of transmission in the AS 5. Note that in a case in which the origin of transmission is in the Asia region, the communication is transferred from connection points in the Asia region to the AS 1 (in other words, the connection points through which the communication passes are distributed for each origin of transmission). Here, the default path is not limited to the hot-potato routing and may be, for example, cold-potato routing or the like. Cold-potato routing is a routing form where communication between ASs passes through a connection point close to a destination, and in a similar example as previously described: It is transferred within AS 5 from the source European region to the destination Asian region and then transferred from the Asia region connection point (GW 12→GW 6) to AS 1 (it is transferred from the Asia region connection point even if the source is in the Asian region, and it is always transferred only from the Asia region connection point).

Further, the embodiment is on the assumption that it is possible to control (switch) which of the hot-potato routing and the cold-potato routing is to be used to transfer communication directed to an arbitrary destination from the AS 1 to another AS in a case in which the traffic control is carried out in the adjacent AS. A method of controlling the traffic in this case is not limited, and a mechanism for changing a local preference value using MED of the BGP or a community, for example, can be used. Specifically, the hot-potato routing in the AS 5 can be realized by issuing, for the AS 5, an advertisement for a path with an MED value that is equal from GWs in the entire region of the AS 1 for a specific destination IP address. Also, it is possible to realize the cold-potato routing in which the destination IP address communication passing through the AS 5 is transferred only from the GWs in the Asia region by setting a smaller MED value for path information advertised from the GWs in the Asia region in the AS 1 than the MED values for path information advertised from GWs in the other regions and issuing an advertisement for the AS 5.

Configuration of AS that has DDoS Handling Device

Figure 2:
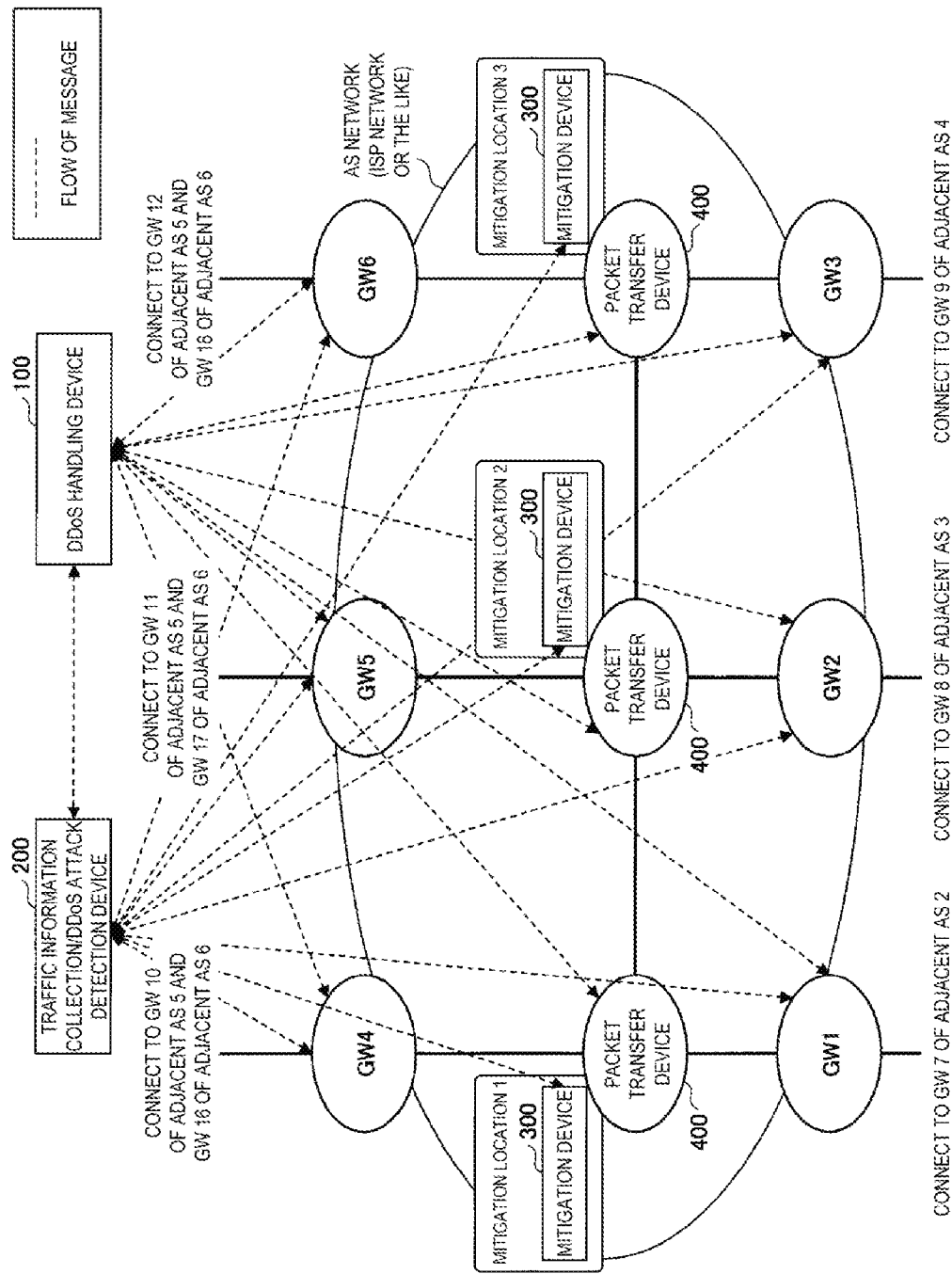
FIG. 2 is a configuration diagram (one example of AS 1) of an AS that contains a DDoS handling device according to the embodiment of the present invention.

Next, a configuration example of an AS that has the DDoS handling device 100 according to the embodiment of the present invention will be described with reference to FIG. 2, Note that FIG. 2 illustrates an example of the AS 1.

As illustrated in FIG. 2, the AS has a plurality of mitigation locations at which one or more mitigation devices 300 are placed, a DDoS handling device 100, a traffic information collection/DDoS attack detection device 200, a packet transfer device 400, and GWs (gateways).

The mitigation devices 300 are devices that are dedicated to handling of DDoS attacks like the device as described in NPL 1 and are capable of carrying out the handling of distinguishing attack communication from normal communication among communications directed to a certain destination and blocking only the attack communication. As other means for handling the DDoS attacks, handing using a filtering function such as a router, manual handling, and the like are conceivable.

The packet transfer device 400 is a network device such as a router or a layer-2 switch that is in charge of routing of packets.

Although the GWs are network devices that are in charge of routing of packets, such as routers, as with the packet transfer device 400, the GWs will be described in a distinguished manner as being located at boundaries from other ASs, client networks, and the like, in particular.

The traffic information collection/DDoS attack detection device 200 detects occurrence of a DDoS attack to a specific destination by periodically collecting flow information (the amount of communication for each flow as a set of transmission and reception IP addresses, transmission and reception port numbers, protocol numbers, and the like, directions of the flow (in/out), and the like) from each interface of each GW and analyzing the collected flow information. Also, the traffic information collection/DDoS attack detection device 200 transmits an attack detection message including an IP address of the target to the DDoS handling device 100 of the AS itself at an arbitrary timing such as when the attack is detected. A notification of a plurality of target IP addresses included in the attack detection message may be provided in a case in which there are a plurality of systems that are targets or in a case in which the system that is the target has a plurality of IP addresses.

Further, the traffic information collection/DDoS attack detection device 200 has a function of measuring the amount of communication directed to the target IP address flowing into each GW from each adjacent AS (or flowing out of each GW to the adjacent AS), the maximum amount of resources of the mitigation devices 300 at the respective locations, the amount of available resources of the mitigation devices at the respective locations, and the like when the DDoS attack occurs or at an arbitrary timing (at every specific period of time, for example), storing a flow information table (example: FIG. 7) and a mitigation location information table (example: FIG. 8), and notifying the DDoS handling device 100 of such information.

The flow information table (example: FIG. 7) is present in units of each GW, for example, and includes a number for uniquely identifying the GW, a region in which the GW is placed (in the present embodiment, the region is described on the assumption that the region in which the GW is placed is the same as the region of the location used to handle communication directed to a target flowing in from the GW; in a case in which both are different, a correspondence information table between each GW and a location is created and associated in advance), a target IP address, an adjacent AS number of an origin of flow of the communication directed to the target (no value in the case of outflow), an adjacent AS number of a destination of outflow of the communication directed to the target (no value in the case of inflow), and the amount of communication directed to the target IP address flowing through the GW from each AS of the origin of flow (or flowing through the AS of the destination of outflow from the GW). The GW number and the region may be registered by an operator or the like when the device is placed, for example, and the target IP address, the AS number of the origin (or destination) of flow, and the amount of communication directed to the target are appropriately updated periodically or when the flow information is collected in response to a request from the DDoS handling device 100.

Also, the mitigation location information table (example: FIG. 8) includes information regarding a number with which it is possible to uniquely identify a location, the maximum amount of resources of mitigation devices 300 in the location, and the amount of available resources (a value obtained by subtracting the amount of resources that are currently being used for the handling from the maximum amount of resources). The location number and the maximum amount of resources may be registered by the operator or the like when the location is set, for example.

Note that the traffic information collection/DDoS attack detection device 200 may be implemented by, for example, SAMURAI or the like described in NPL 5.

The DDoS handling device 100 is a device that realizes distribution of a load of resources among locations while preventing an increase in delay in the communication directed to the target associated with the handling. The DDoS handling device 100 has a function of communicating with the traffic information collection/DDoS attack detection device 200 and receives information regarding the target IP address, the amount of communication directed to the target IP address flowing into each GW from each adjacent AS (or flowing out of each GW into the adjacent AS), the maximum amount of resources of the mitigation devices 300 at the respective locations, the amount of available (remaining) resources and the like and the attack detection message.

Also, the DDoS handling device 100 has a function of communicating with each GW and the packet transfer device 400 and has a function of changing a communication path to an arbitrary destination in another AS to a desired path by issuing an advertisement of BGP path information pertaining to the arbitrary destination generated in processing performed by the attack handling setting unit 114, which will be described later, to another AS via an arbitrary GW. Note that although the case in which traffic control between ASs is carried out using a BGP that is a current mainstream for control between ISPs is described in the present embodiment, a technology used is not limited to the BGP as long as it is possible to realize control to ask each adjacent AS to change traffic to an arbitrary destination to be transferred from a GW in a specific region and control to ask each adjacent AS to change the traffic to the arbitrary destination to be transferred from a GW in a region near a region of the origin of transmission (hot-potato routing).

In addition, the DDoS handling device has a function of changing a path of communication directed to an arbitrary destination and drawing the communication into a location corresponding to a GW (entrance GW) into which the communication flows (in a case in which the communication flows in from a plurality of entrances, there is a probability that the communication is distributed to a plurality of locations) using the BGP, the anycast routing, or the like and a function of drawing the communication into an arbitrary one location without using the anycast routing.

Hardware Configuration Example of DDoS Handling Device 100

The DDoS handling device 100 described above can be realized by causing a computer to execute a program describing details of processing as described in the embodiment, for example.

In other words, the DDoS handling device 100 can be realized by executing a program corresponding to the processing carried out by the DDoS handling device 100, using hardware resources such as a CPU and a memory incorporated in the computer. The aforementioned program can be recorded, saved, and distributed in a computer-readable recording medium (portable memory or the like). In addition, the aforementioned program can also be provided through a network such as the Internet, an e-mail, or the like.

Figure 3:
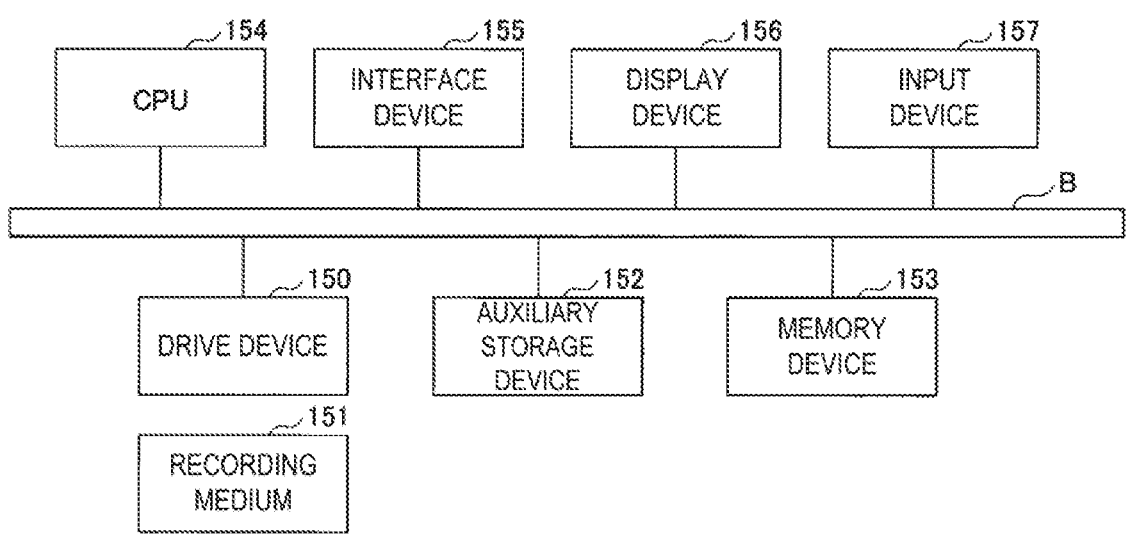
FIG. 3 is a hardware configuration diagram of the DDoS handling device according to the embodiment of the present invention.

FIG. 3 is a diagram illustrating a hardware configuration example of the aforementioned computer according to the present embodiment. The computer in FIG. 3 has a drive device 150, an auxiliary storage device 152, a memory device 153, a CPU 154, an interface device 155, a display device 156, an input device 157, and the like that are connected to each other via a bus B.

The program that realizes the processing in the computer is provided by a recording medium 151 such as a compact disk-read only memory (CD-ROM), a digital versatile disk (DVD), or a flash memory, for example. If the recording medium 151 storing the program is set in the drive device 150, then the program is installed in the auxiliary storage device 152 from the recording medium 151 via the drive device 150. However, the program is not necessarily installed from the recording medium 151 and may be downloaded from another computer via a network. The auxiliary storage device 152 stores the installed program and also stores required files, data, and the like.

The memory device 153 reads and stores the program from the auxiliary storage device 152 in a case in which a command for activating the program is issued. The CPU 154 executes various functions and processing of the DDoS handling device 100 as will be described later in accordance with the program stored in the memory device 153 and various kinds of data such as parameters required for executing the program. The interface device 155 is used as an interface for establishing connection to a network and executes various kinds of communication processing for communicating with the network such as the Internet. The display device 156 displays a graphical user interface (GUI) or the like based on the program. The input device 157 is configured of a keyboard and a mouse, a button, a touch panel, or the like, and is used to allow for inputs of various operation commands. Note that the display device 156 and the input device 157 may not be provided.

The DDoS handling device 100 is not limited to the hardware configuration described above and may be realized by any another appropriate hardware configuration. Note that the configuration illustrated in the present embodiment is an example, and for example, the traffic information collection/DDoS attack detection device 200 may be incorporated in the DDoS handling device 100.

Details of DDoS Handling Device 100

Figure 4:
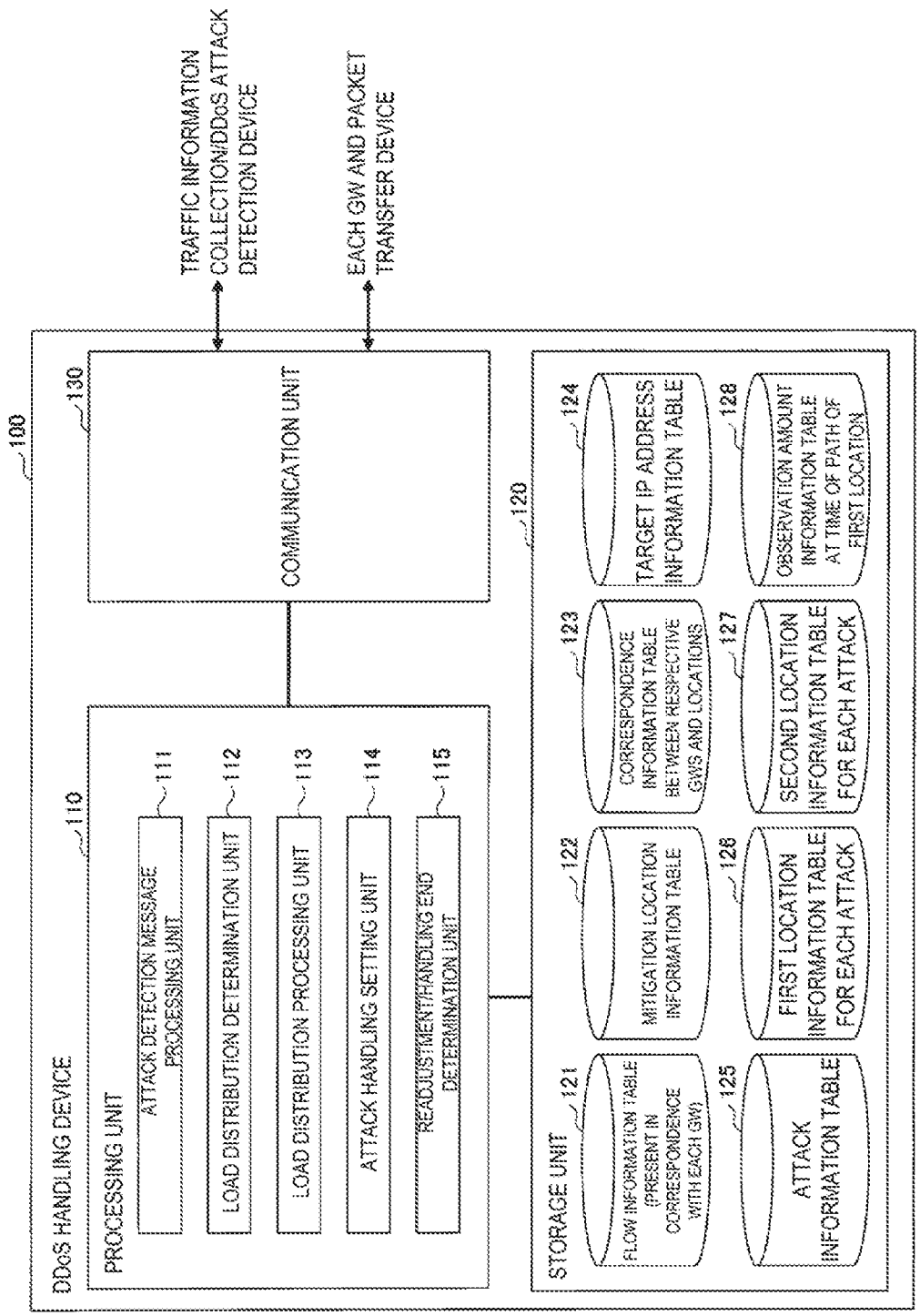
FIG. 4 is a functional configuration diagram of the DDoS handling device according to the embodiment of the present invention.

Next, the DDoS handling device 100 according to the embodiment of the present invention will be described in detail with reference to FIG. 4. FIG. 4 is a block diagram illustrating a functional configuration of the DDoS handling device 100 according to the embodiment of the present invention. As illustrated in FIG. 4, the DDoS handling device 100 includes a processing unit 110, a storage unit 120, and a communication unit 130.

As illustrated in FIG. 4, the processing unit 110 includes an attack detection message processing unit 111, a load distribution determination unit 112, a load distribution processing unit 113, an attack handling setting unit 114, and a readjustment/handling end determination unit 115, Details of processing performed by these functional units will be described later.

The storage unit 120 stores a flow information table 121, a mitigation location information table 122, a correspondence information table 123 between each GW and a location, a target IP address information table 124, an attack information table 125, a first location information table 126 for each attack, a second location information table 127 for each attack, and an observation amount information table 128 at the time of the path of the first location. FIG. 7 illustrates an example of the flow information table 121, FIG. 8 illustrates an example of the mitigation location information table 122, FIG. 9 illustrates an example of the correspondence information table 123 between each GW and a location, FIG. 10 illustrates an example of the target IP address information table 124; FIG. 11 illustrates an example of the attack information table 125, FIG. 12 illustrates an example of the first location information table 126 for each attack, FIG. 13 illustrates an example of the second location information table 127 for each attack, and FIG. 14 illustrates an example of the observation amount information table 128 at the time of a first path.

The communication unit 100 has a function of communicating with the traffic information collection/DDoS attack detection device 200, each GW, and the packet transfer device 400.

Hereinafter, operations of the respective functional units in the processing unit 110 will be described in detail.

Attack Detection Message Processing Unit 111

The attack detection message processing unit 111 stores a target IP address included in an attack detection message in the target IP address information table 124 (example: FIG. 10) in relation to the processing at the time of receiving the message from the traffic information collection/DDoS attack detection device 200. In addition, the attack detection message processing unit 111 determines the amount of communication directed to each target IP address that has flowed into the AS itself, the region of the GW from which the communication directed to each target IP address has flowed into the AS itself, and the region of the GW from which the communication directed to each target IP address flows out to another AS from the flow information table 121 (example: FIG. 7) of each GW and the received target IP address and registers, in the attack information table 125 (example: FIG. 11), information regarding the adjacent AS number of the origin of flow, the target IP address (merged in units of /24), the current path number (an initial value is NULL), the region of entrance (this is a region where a GW into which the communication directed to the target has flowed is placed, and it is assumed that a mitigation location is placed in units of the region), the amount of communication directed to the target that enters from the entrance (a total value in a case in which there are a plurality of entrance GWs in the region or in a case in which a plurality of target IP addresses are included), and a region of exit (a region where a GW from which the communication directed to the target flows out is placed).

Thereafter, the attack detection message processing unit 111 starts to determine whether or not it is necessary to distribute a load using the load distribution determination unit 112. Note that the reason for performing the merging in units of /24 is because path control in units of addresses that are smaller than the units of /24 is not accepted from another AS in most of ISPs according to the BGP that is currently a mainstream in path control between the ISPs, and merging in the minimum units is assumed in a case in which path control in smaller units than the units of /24 becomes available between the ISPs in the future. The same applies to the resource load distribution processing, which will be described later, though control in units of /24 is carried out. Note that the technology according to the present invention can also be applied to a case in which path control is carried out merely in the AS itself without carrying out the path control between the ASs, and in this case, control in units of arbitrary addresses, such as in units of /32 is conceivable.

Load Distribution Determination Unit 112.

The load distribution determination unit 112 is a processing unit that determines whether or not there are sufficient resources at each location when the communication directed to the target flowing in from another adjacent AS is handled using a default path without any change (hot-potato routing in the adjacent AS+anycast routing in the AS itself), and handles the communication using the default path without any change in a case in which there are sufficient resources, or starts load distribution processing in a case in which the resources are insufficient.

The load distribution determination unit 112 determines whether or not there are sufficient resources in a case in which the amount of communication directed to the target flowing in from each entrance (region) is currently drawn to a location corresponding to the entrance (the location in the entrance region in the present embodiment), on the basis of the attack information table 125 (example: FIG. 11), the correspondence information table 123 between each GW and a location (example: FIG. 9), and the mitigation location information table 122 (example: FIG. 8). For example, the load distribution determination unit 112 compares the amount of available resources at the location 1 in North America with a sum of the amounts of communication directed to the target flowing in from the respective GWs in North America and determines that there are sufficient resources in a case in which the amount of available resources is larger. In a case in which there are sufficient resources at all the locations, the path number of the target IP address in the attack information table 125 (example: FIG. 11) is set to 1, a notification of the adjacent AS number and the target IP address is issued to provide an advertisement of a BGP path for directing the destination of the communication directed to the target to the locations via the attack handling setting unit 114, and the handling is then carried out by drawing the communication directed to the target into the respective locations using the default traffic path without any change (here, it is assumed that the communication directed to the target is drawn into the locations corresponding to the entrances through the hot-potato routing carried out in the adjacent AS and the anycast routing carried out in the AS itself).

In a case in which the resources are insufficient, the load distribution processing using the load distribution processing unit 113 is started. Also, the load distribution determination unit 112 sets a timer that periodically invokes the readjustment/handling end determination unit 115 after invoking from an initial attack detection message.

Load Distribution Processing Unit 113

The load distribution processing unit 113 extracts a location (first location) in a case in which handling is carried out using a default traffic path (hot-potato routing+location corresponding to entrance GW) and a location (second location) corresponding to an exit GW in the default traffic path in units of the "adjacent AS of the origin of flow+target IP address (in units of /24)" and calculates which of locations is to be used to handle each "adjacent AS of the origin of flow+target IP address (in units of /24)" in order to solve shortage of resources between locations (load distribution). Here, in a case in which the traffic control is carried out in the adjacent AS, another path, through which transferring can be performed with a delay that is comparable to a delay of the default traffic path, which can handle communication using resources at a location that is different from that of the aforementioned path, is calculated in units of "adjacent AS of the origin of flow+target IP address (in units of /24)".

First, path generation performed by the load distribution processing unit 113 will be described. The load distribution processing unit 113 estimates the amount of communication directed to the target flowing in from each region and stores the amount in the first location information table 126 (example: FIG. 12) for each attack in a case in which the adjacent AS transfers the communication directed to the attack through the default path (hot-potato routing) for each "adjacent AS of the origin of flow+target IP address (in units of /24)".

As illustrated in FIG. 12, the first location information table 126 is configured of a number of the adjacent AS that is the origin of flow, a target IP address units of /24), a path number (always 1), a region of the entrance, an amount of communication directed to the target, and a corresponding location number. Each value in the attack information table 125 (example: FIG. 11) is registered for the current path using the first location from among "adjacent ASs of origins of flow+target IP addresses" by copying the value without any change. In a case in which the current path is the "adjacent AS of the origin of flow+target IP address" when the second location is used and the traffic control is carried out in the adjacent AS in the attack information table 125, the observation amount information table 128 (example: FIG. 14) at the time of the path of the first location (a table for holding the latest value in the amount of communication flowing in from each region in the state of the path when the first location is used for each "adjacent AS of the origin of flow+target IP address") is referred, it is assumed that the amount (this can be acquired from the attack information table) of communication currently flowing in only from a specific region is to be distributed to the respective regions at the same ratio as that of the amount of communication that has flowed in from the respective regions, and the value in such a case is registered as a value of the amount of communication at each entrance in the first location information table 126 (example: FIG. 12).

In a case in which "adjacent AS of the origin of flow=5 and the target IP address=198.51.100.0/24" is in a state in which communication of 50 Gbps is currently flowing in only from Asia (at the time of using the second location in a case in which the traffic control is carried out in the adjacent AS), and the values as in the observation amount information table 128 (example: FIG. 14) at the time of the path of the first location for each attack in the present invention have been registered, and in a case in which the path is changed to the path when the first location is used, for example, it is assumed that the communication flows at a ratio of North America:Europe:Asia of 0:4:1, and the amount of communication=0 Gbps for North America, the amount of communication=50*49/50=40 Gbps for Europe, and the amount of communication=50*10/50=10 Gbps for Asia are registered in the first location information table 126 (example: FIG. 12). Note that in cases in which the traffic control is carried out in the adjacent AS and in a case in which there is communication directed to the target that is to be returned from the path of the second location to the path of the first location, there is a probability that the estimated amount of communication directed to the target actually does not flow through each GW. For this reason, the flow information of each GW and the amount of available resources at each location are checked after the load distribution is carried out, and in a case in which the shortage of resources has not yet been solved, the load distribution processing is executed again.

The load distribution processing unit 113 further refers to the exit region in the attack information table 125 (example: FIG. 11) and the location number of the region in the correspondence information table between each GW and a location for each "adjacent AS of the origin of flow+target IP address (in units of /24)" and registers, in the second location information table 127 (example: FIG. 13), which is configured of the number of the adjacent AS of the origin of flow, the target IP address (in units of /24), the path number (always 2), the region of the entrance (only in a case in which the traffic control is carried out in the adjacent AS), the region of the exit, the location number, and the amount of communication directed to the target, for each attack.

In a case in which the traffic control is carried out in the adjacent AS, the region of the exit in the attack information table 125 (example: FIG. 11) is further referred for each "adjacent AS of the origin of flow+target IP address", and the same region is registered as a value of the region of the entrance. For the amount of communication directed to the target of each "adjacent AS of the origin of flow+target IP address", the value of the "adjacent AS of the origin of flow+target IP address" that is currently using the path when the second location is used (the path number is 2) in the attack information table 125 (example: FIG. 11) is copied without any change. Also, for the one currently using the path when the first location is used (the path number is 1), the attack information table 125 (example: FIG. 11) is referred, and a total value of the amounts of communication directed to the "adjacent AS of the origin of flow+target IP address" flowing in from the respective regions is registered.

Figure 5:
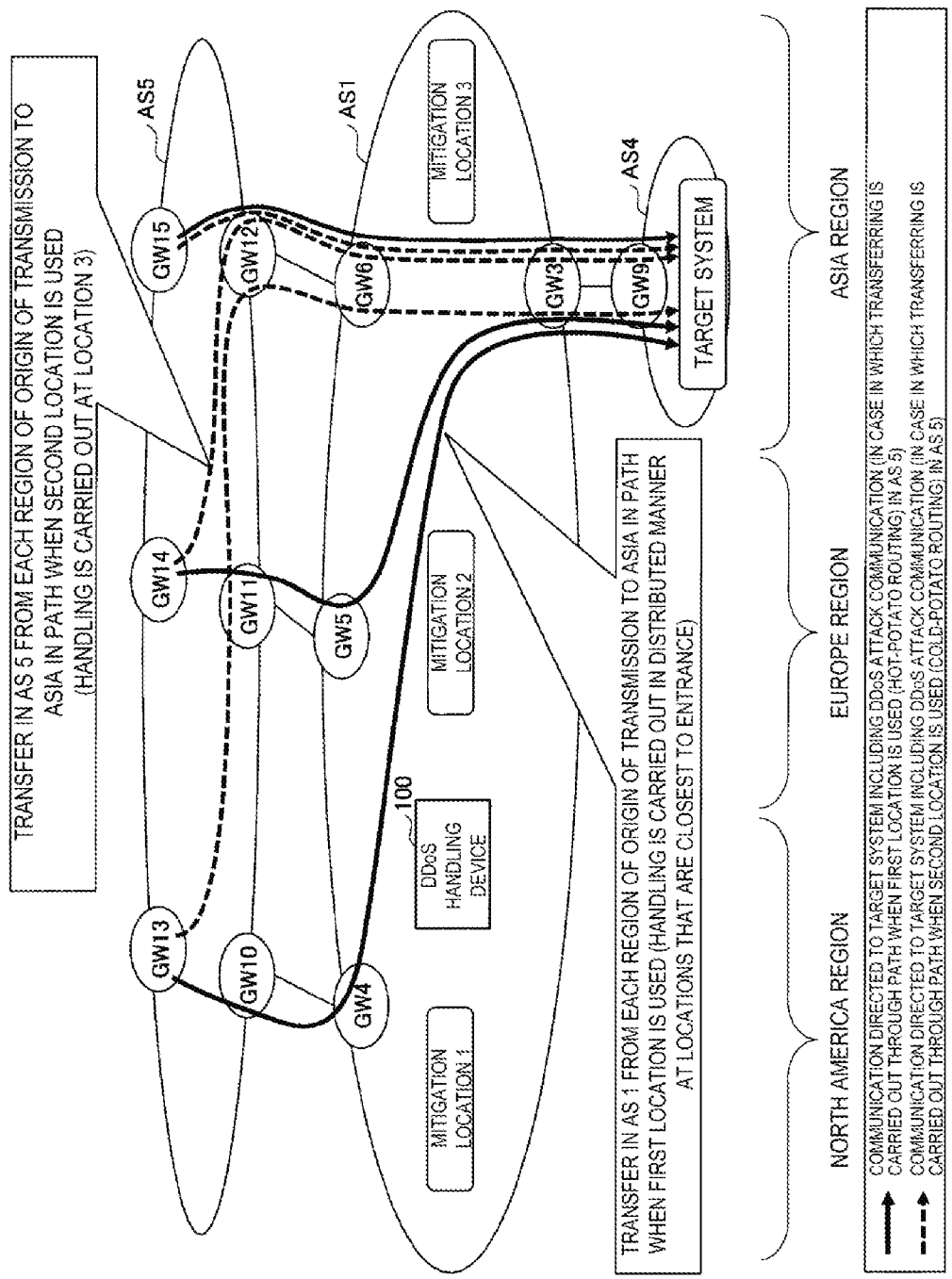
FIG. 5 is a relationship diagram between a path when a first location is used and a path when a second location is used in a case in which traffic control for distributing a resource load between the locations is carried out in adjacent ASs.

Here, the relationship between the path when the first location is used and the path when the second location is used in the case in which the traffic control is carried out in the adjacent AS is as illustrated in FIG. 5, and the drawing illustrates that it is possible to realize a delay that is comparable to the delay of the path in the case of using the first location, in the case in which each communication directed to the target can be carried to the region of the exit of the communication directed to the target within the adjacent AS (in the case of the path when the second location is used). Note that although it is also possible to perform control such that the communication directed to the target flows in only from the GW in the region other than the exit (Europe, for example), the communication originating from the Asia region in the AS 5 in FIG. 5 is once bypassed to Europe in the AS 5, for example, and there is a probability that the delay increases. Therefore, in order to prevent the increase in delay even in the case in which the traffic control is carried out in the adjacent AS and regardless of the region of the origin of transmission, it is necessary to extract a path in a case in which the communication is carried up to the entrance (GW) in the same region as that of the exit and is then passed to the AS itself as a path when the second location is used as in the present embodiment. In addition, the relationship between the path when the first location is used and the path when the second location is used in the case in which the traffic control is carried out in the AS itself is as illustrated in FIGS. 6A and 6B, and it is possible to realize a delay that is comparable to that when the first location is used by using the location on the exit side as the second location in this case as well. FIG. 6A illustrates the case in which the first location is used, and the handling is carried out by drawing the communication directed to the target into the location that is the closest to each entrance using anycast or the like. Also, FIG. 6B illustrates the case in which the second location is used, and the path is changed such that the communication directed to the target is drawn into and directed to the IP address of the location near the exit.

Next, processing for calculating which of the first location and the second location is to be used to handle each "adjacent AS of the origin of flow+target IP address (in units of /24)" in order to solve shortage of resources between locations (load distribution) will be described. Note that it is possible to transfer each "adjacent AS of the origin of flow+target IP address (in units of /24)" with a comparable delay both through the path when the first location is used and through the path when the second location is used as described above. Here, the following two cases will be described as objective functions for optimization.

Objective function 1: In order not only to solve shortage of resource but to further enhance containing efficiency, the resource utilization rates at the respective locations are maximally equalized.

Objective function 2: In consideration not only of solving the shortage of resource but of influences on communication associated with a change in path, the number of communications directed to the target requiring a change in path from the current path is minimized.

Further, a case in which an optimal solution is obtained through full search and a case in which the optimal solution is obtained by constructing an optimization problem will respectively be described here.

In the case of the objective function 1 and the full search, the load distribution processing unit 113 performs the following processing on the basis of the first location information table 126 (example: FIG. 12), the second location information table 127 (example: FIG. 13), and the correspondence information table 123 (example: FIG. 9) between each GW and a location. In the processing, a resource utilization rate (=the amount of handling/the maximum amount of resources×100) at each location in a case in which one of all "adjacent ASs of the origins of flow+target IP addresses (in units of /24)" is the second location and the others are the first locations is calculated, and the maximum value thereof (in a case in which the location 1=80%, the location 2=60%. and the location 3=40%, for example, 80% is the maximum value) is held. It is possible to decide an optimal combination for the objective function 1 by performing this calculation for all the cases, such as a case in which two of all the "adjacent ASs of the origins of flow+target IP addresses units of /24)" are the second locations and the others are the first locations, a case in which the three of them are the second locations and the others are the first locations, . . . , and extracting a combination of paths of each "adjacent AS of the origin of flow+target IP address (in units of /24)" with which the maximum value is minimized.

In a case of the objective function 1 and in a case in which the optimization problem is constructed to obtain a solution, it is possible to obtain a solution by formulating the optimization problem as a mixed integer programming problem as will be described below, for example, and using a branch and bound method, a cutting plane method, or the like.

Objective function: A combination of transfer patterns of the respective attacks flowing in from the respective adjacent ASs is decided such that a difference (F−G) between the maximum value (F) and the minimum value (G) of the resource utilization rates at the respective locations is minimized.

Constraint conditions:

For each j-th target of an i-th adjacent AS, the following Relationship is constructed.

The amount of communication flowing in from a region k of the entrance is defined as $x\_ijk$ ([Relationship 0] $x\_ijk \geq 0$)

Hereinafter, a case in which two patterns (a first path and a second path), namely $\{x\_ij1, x\_ij2, x\_ij3\}=\{0, 10, 10\}$ or $\{0, 0, 20\}$ are employed will be described as an example.

[Relationship 1.] The sum of the amounts of attacks flowing in from the respective regions=the total amount of j-th communication directed to the target flowing in from the i-th adjacent AS $$x\_ij2 + x\_ij3 = 20$$

For the first location and the second location, a variable $y\_ij1$ representing a state 0 or 1 indicating which of the locations is to be used for handling is introduced (in a case of 1, the pattern is employed; 1=1 represents the location 1 while 1=2 represents the location 2).

[Relationship 2] $y\_ij1, y\_ij2 \in \{0,1\}$

[Relationship 3] A variable indicating whether to employ the state of the location 1+a variable indicating whether to employ the state of location 2=1 (this is a constraint for allowing only one path to be effective at the same time)

$$y\_ij1 + y\_ij2 = 1$$

[Relationship 4] The amount of communication flowing through the region k of the entrance=(the amount of communication flowing in from the region k at the time of the path when the location 1 is used×$y\_ij1$)+(the amount of communication flowing in from the region k at the time of the path when the location 2 is used×$y\_ij2$)

$$x\_ij2 = (10 \times y\_ij1) + (0 \times y\_ij2)$$

$$x\_ij3 = (10 \times y\_ij1) + (20 \times y\_ij2)$$

The constraints in terms of the amount of communication directed to the target are set as Relationships 5 and 6 below.

[Relationship 5] The sum of the amounts of communication directed to all targets=the sum of communications directed to the respective targets flowing in from the respective regions

[Relationship 6] The sum of the amounts of communication directed to all targets from an adjacent ASi=the sum of the amounts of communication directed to the respective targets from the adjacent ASi flowing in from the respective regions The constraints in terms of the location resources are set as Relationships 7 to 11.

[Relationship 7] The amount of communication directed to the target handled at the location i (designated as $z\_i$)=the sum of the amounts of communication directed to the target flowing in from the region corresponding to the location

[Relationship 8] $z\_i \leq$ the amount of available resources at the location i

[Relationship 9] Resource utilization rates at the respective locations$\leq F$

[Relationship 10] Resource utilization rates at the respective locations$\geq G$

[Relationship 11] $z\_i \geq 0$

In the case of the objective function 2 and the full search, the load distribution processing unit 113 performs the following processing on the basis of the first location information table 126 (example: FIG. 12), the second location information table 127 (example: FIG. 13), and the correspondence information table 123 (example: FIG. 9) between each GW and a location. In the processing, the resource utilization rate at each location in a case in which one of all the "adjacent ASs of the origins of flow+target IP addresses (in units of /24)" is the second location and the others are the first locations is calculated first, a combination with which the resource utilization rates at all the locations are equal to or less than 100% (or equal to or less than a threshold or the like set to handle variations in the amount of attacks) is extracted, and the combination that requires the smallest number of "adjacent ASs of the origins of flow+target IP addresses (in units of /24)" requiring a change from the current location is extracted. This is performed for all the cases such as a case in which two of all the "adjacent ASs of the origins of flow+target IP addresses (in units of /24)" are the second locations and the others are the first locations, a case in which three of them are the second locations and the others are the first locations, . . . , a combination requiring the smallest number of change in path associated with the switching of locations is extracted, thereby deciding a combination that is optimal for the objective function 2. Note that it is possible to shorten the calculation time by ending the searching at the timing when one that requires one change in path and satisfies the condition of the resource utilization rate (equal to or less than 100% or equal to or less than the threshold value at all the locations) is found because the minimum number of change in path is 1.

In a case of the objective function 2 and in a case in which the optimization problem is constructed to obtain a solution, it is possible to obtain the solution by formulating the optimization problem as a mixed integer programming problem as will be described below and using a branch and bound method, a cutting plane method, or the like, for example.

Objective function: A variable (H) for counting the number of changes from the current path as will be described below is introduced, and H is minimized.

For the j-th target of the i-th adjacent AS, a variable $y\_ij1$ representing a state 0 or 1 indicating which of the first location and the second location is to be used for handling is introduced (in a case of 1, the pattern is employed; l=1 represents the location 1 while l=2 represents the location 2).

Using y representing (as a reference) the current state of the location (path number) for each "adjacent AS+target", H is expressed as follows.

$$H=(1-y\_ij1)+(1-y\_(i(j+1))+ \ldots +$$

Constraint Conditions:
[Relationship 9] and [Relationship 10] in the constraint conditions for the objective function 1 are replaced with the following Relationships, respectively, and the same applies to the other conditions.

Resource utilization rate at each location≤100

In a case in which a threshold value is set, the right side is changed to the threshold. value. If the resource utilization rate of equal to or less than 80% is used as a condition, for example, "the resource utilization rate at each location≤80" is set.

The load distribution processing unit 113 decides the optimal combination and then updates the path number and the entrance information of each "adjacent AS of the origin of flow+target IP address (in units of /24)" in the attack information table 125 (example: FIG. 11) on the basis of the result of the calculation. At this time, the load distribution processing unit 113 copies the current (the path when the first location is used) entrance information (the region and the amount of communication directed to target) in the attack information table 125 and stores the current entrance information in the observation amount information table 128 (example: FIG. 14) at the time of the path of the first location, for the "adjacent AS of the origin of flow+target IP address (in units of /24)" in the case in which the traffic control is carried out in the adjacent AS and the current path is changed from the path (path number=1) when the first location is used to the path (path number=2) when the second location is used.

Also, the load distribution processing unit 113 provides a notification of information (the number of the adjacent AS of the origin of flow, the target IP address, and the path number after the change) regarding the "adjacent AS of the origin of flow+target IP address (in units of /24)" for which a change in path or new handling (new drawing into a mitigation location) associated with switching of locations used for the handling occurs to the attack handling setting unit 114 and also invokes the attack handling setting unit 114.

Attack Handling Setting Unit 14

The attack handling setting unit 114 issues an advertisement of a BGP path for transferring communication directed to a target IP address through a path after a change to an adjacent AS of an origin of flow in a case in which traffic control is carried out in the adjacent AS on the basis of the number of adjacent AS of the origin of flow, the target IP address, and the path number after the change provided as the notification from the load distribution processing unit 113. In a case of switching the path to the path when the first location is used, for example, an advertisement of a BGP path with an MED value set to the same value in the path information of the communication directed to the target IP address (/24) is issued from entrance GWs in all the regions to a GW (eBGP peer) facing a designated adjacent AS. In a case of switching the path to the path when the second location is used, and it is desired to allow the communication to flow in only from an entrance in the Asia region, for example, the advertisement of the BGP path is issued from the entrance GW in the Asia region to the GW (eBGP peer) facing the designated adjacent AS by setting the MED value in the path information of the communication directed to the target IP address (/24) to be a value that is smaller than the MED value in the path information from the entrance GWs in the other regions. Also, anycast routing is applied in the AS itself, and an advertisement for a BGP path for transferring the communication directed to the target IP address up to a mitigation location is issued for each GW and the packet transfer device (iBGP peer) in the AS itself. Note that the procedure and the method of the traffic control described above are merely examples, and the procedure and the method are not limited only to the above description as long as it is possible to realize the path control assumed in the present embodiment. Also, in the case in which the traffic control is carried out in the AS itself and the path is to be switched to the path when the first location is used, the anycast routing is applied in the AS itself, first, and the advertisement for the BGP path for transferring the communication directed to the target IP address up to the mitigation location is then issued for each GP and the packet transfer device (iBGP peer) in the AS itself. In the case of switching the path to the path when the second location is used, the advertisement for the BGP path for transferring the communication directed to the target IT address up to the mitigation location on the exit side is issued to each GW and the packet transfer device (iBGP peer) of the AS itself without applying the anycast routing in the AS itself, for example.

Readjustment/Handling End Determination Unit 115

The readjustment/handling end determination unit 115 has a function of being periodically invoked by a timer and ending readjustment (carrying out the resource load distribution again)/handling associated with an increase or decrease in the amount of communication directed to the target.

The readjustment/handling end determination unit 115 performs processing of checking the amount of available resources in the mitigation location information table 122 (example: FIG. 8) and invoking the load distribution processing unit 113 in a case in which the amount of available resources is below a preset threshold value, for example. This is a mechanism to address shortage of resources due to an increase in the amount of attack that is currently occurring.

In addition, the readjustment/handling end determination unit 115 updates information pertaining to the target that is currently occurring in the attack information table 125 (example: FIG. 11) on the basis of the flow information table 121 (example: FIG. 7) of each GW. As content of the updating, an increase or decrease in ASs of origins of flow, an increase or decrease in entrance regions, and an increase or decrease in value of the amount of communication directed to the target are conceivable for an arbitrary target IP address. Thereafter, the handling of the attack ends in a case in which the amount of communication directed to the target (a total value of the amounts of communication in the respective regions in a case in which a plurality of regions serve as entrances) is below a preset threshold value. Specifically, the target IP address for which handling is to be ended is deleted from the target IP address information table 124 (example: FIG. 8 and an advertisement of a BGP path with a destination of the communication directed to the target, for which the handling is to be ended, being changed to a destination at ordinary time (also, the MED value is returned to the original one in a case in which the MED value has been changed) is issued via the attack handling setting unit 114, thereby stopping the drawing into the arbitrary mitigation location.

Example of Procedure for Handling DDoS Attack

Figure 15:
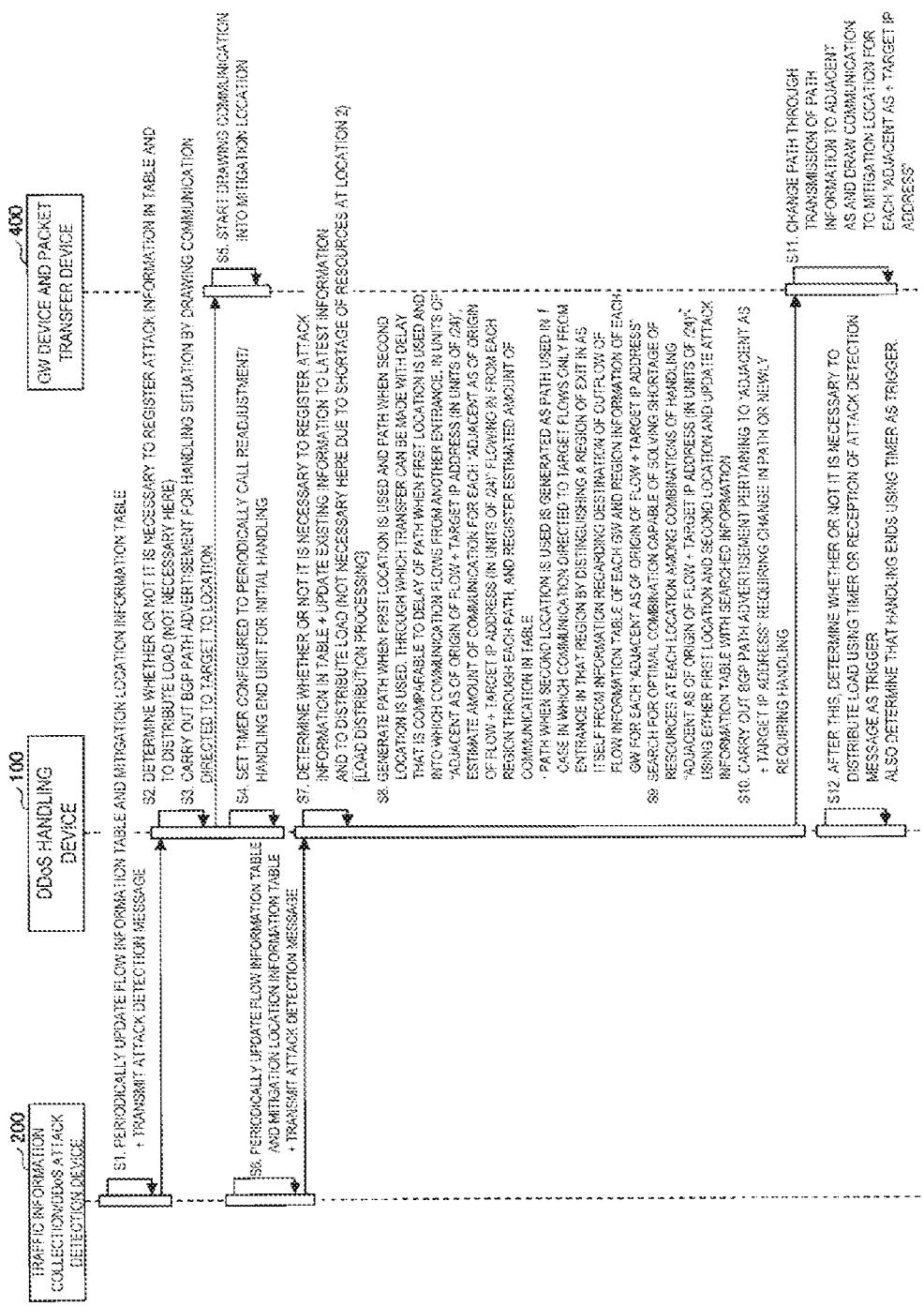
FIG. 15 is a diagram illustrating an example of a DDoS attack handling procedure.

Next, an example of a procedure for handling a DDoS attack according to the embodiment of the present invention will be described with reference to FIG. 15. FIG. 15 is a sequence diagram illustrating a procedure for handling a DDoS attack according to the embodiment of the present invention. Here, it is assumed that the AS 1 provides services for detecting and handling DDoS attacks targeted to the AS 2, the AS 3, and the AS 4 to the respective ASs. Also, first, a situation in which DDoS attacks (the amount of communication from each origin of transmission is 10 Gbps) originating from North America of the AS 5 and Europe of the AS 6 and directed to a target system 1 in the AS 2 have occurred, handling have been carried out, DDoS attacks (the amount of communication is 20 Gbps for Europe of the AS 5, 10 Gbps for Asia of the AS 5, and 20 Gbps for Europe of the AS 6) originating from Europe and Asia of the AS 5 and Europe of the AS 6 and directed to target systems 2 and 3 in the AS 4 have further occurred, and handling is now to be carried out is assumed. In addition, there are mitigation locations in three regions in the AS 1, with the maximum amount of resources of the mitigation devices at each location being 60 Gbps. Also, a case in which the traffic control for distributing a load of resources among the locations in this example is carried out by changing a path in an adjacent AS will be described.

Occurrence of Attack Directed to Target System 1

S1) The traffic information collection/DDoS attack detection device 200 periodically collects flow information from each GW and stores the amount of communication for each "destination IP address+adjacent AS of an origin of flow (destination of outflow)" in the flow information table (Example: FIG. 7). Also, the traffic information collection/DDoS attack detection device 200 periodically collects the amount of available resources from the mitigation device 300 at each location and stores the amount of available resources in the mitigation location information table (example: FIG. 8). Further, the traffic information collection/DDoS attack detection device 200 detects an attack to the target system 1 in the AS 2 through analysis of the flow information (the attack is detected in a case in which the amount of communication directed to the specific destination is equal to or greater than a preset threshold value) and transmits an attack detection message including an IP address of the target system 1 to the DDoS handling device 100.

S2) The DDoS handling device 100 stores the target IP address included in the received message in the target IP address information table 124 (example: FIG. 10). Also, the DDoS handling device 100 determines the amount of communication directed to the target IP address that has flowed into the AS itself, the area of the GW from which the communication directed to the target IP address has flowed into the AS itself, and the area of the GW from which the communication directed to the target IP address has flowed out to another AS on the basis of the flow information table 121 (example: FIG. 7) of each GW and the received target IP address and registers, in the attack information table 125 (example: FIG. 11) the adjacent AS number of the origin of flow, the target IP address (merged in units of /24), the current path number, the region of the entrance, the amount of communication directed to the target entering from the entrance (a total amount in a case in which there are a plurality of entrance GWs in the region or in a case in which a plurality of target IP addresses are included), and the information of the region of the exit. Further, the DDoS handling device 100 determines whether or not there are sufficient resources in a case in which the current amount of communication directed to the target flowing in from each entrance (region) is drawn into a location corresponding to the entrance on the basis of the attack information table 125 (example: FIG. 11), the correspondence information table 123 (example: FIG. 9) between each GW and a location, and the mitigation location information table 122 (example: FIG. 8), and in a case in which the resources are insufficient, starts load distribution processing. Here, because the amount of communication directed to the target (=10 Gbps) flowing in from North America<the amount of available resources (=60 Gbps) at the location 1, the amount of communication directed to the target (=10 Gbps) flowing in from Europe<the amount of available resources (=60 Gbps) at the location 2, there is no flowing in from Asia, and there are thus sufficient resources at each location even in a case in which handling is carried out without any change in the current path, load distribution is not carried out.

S3) The DDoS handling device 100 sets the path number of the attack information table 125 (example; FIG. 11) to 1 and issues, for the GWs and the packet transfer device 400, a BGP path advertisement for performing handling of drawing the communication directed to the target into the mitigation device 300.

S4) A timer that periodically invokes the readjustment/handling end unit 115 is set because there are no attacks that are being currently handled (initial handling).

S5) The GWs and the packet transfer device 400 starts to draw the communication directed to the target into each mitigation location in accordance with the received BGP path information.

Occurrence of Attacks Directed to Target Systems 2 and 3

S6) The traffic information collection/DDoS attack detection device 200 detects occurrence of attacks to the target systems 2 and 3 in the AS 4 and transmits an attack detection message including the IP addresses thereof to the DDoS handling device 100 similarly to the procedure 1) (S1).

S7) Similarly to the procedure 2) (S2), the DDoS handling device 100 stores the received (two) IP addresses directed to the target in the target IP address information table 124 (example: FIG. 10), adds a record related to these target IP addresses in the attack information table 125 (example: FIG. 11), and updates a current value of entrance information (the region and the amount of communication directed to the target) related to the attack to the target system 1, which has already been handled, to the latest value on the basis of the flow information table 121 (example: FIG. 7) of each GW Also, the DDoS handling device 100 determines whether or not there are sufficient resources in a case in which the amount of communication directed to the target flowing in from each entrance (region) is drawn to the location corresponding to the entrance, and in a case in which the resources are insufficient, starts load distribution processing. Here, because the amount of communication directed to the target (=60 Gbps) flowing in from Europe>the amount of available resources (=50 Gbps: obtained by subtracting the amount used for the handling for the target system 1 from the maximum amount of resources) at the mitigation location 2, and the resources at the location 2 are insufficient, the load distribution processing is started.

S8) The DDoS handling device 100 generates a path when the first location is used and a path when the second location is used, through which transfer can be made with a delay that is comparable to the delay of the path when the first location is used and into which communication flows from another entrance, in units of the "adjacent AS of the origin of flow+target IP address (in units of /24)", estimates the amount of communication for each "adjacent AS of the origin of flow+target IP address (in units of /24)" flowing in from each region through each path, and registers the amount of communication in the first location information table 126 (example: FIG. 12) for each attack and the second location information table 127 (example: FIG. 13) for each attack. Here, the path when the first location is used represents a path in an initial state (current), and it is possible to register the record of the first location information table 126 (example: FIG. 12) by copying the value in the attack information table 125 (example: FIG. 11) without any change. Note that although information of the entrance with the value of 0 is also described in the example illustrated in FIG. 12, the information of the entrance with the value of 0 may be omitted, and the information may appropriately be added when the value becomes equal to or greater than 0 as in FIG. 11.

Also, the path when the second location is used is generated as a path in a case in which the communication directed to the target flows in only from the entrance of the region by distinguishing the region of the exit in the AS itself on the basis of the information regarding the destination of outflow in the flow information table 121 (example: FIG. 7) of each GW and the region information of each GW, for each "adjacent AS number of the origin of flow+target IP address". For example, because the exit region of "adjacent AS number=5 and the target IP address=198.51.100.0/24" is Asia according to the attack information table 125 (example: FIG. 11), the entrance region in the second location information table 127 (example: FIG. 13) is set to Asia (note that in the case in which the traffic control is carried out in the AS itself, the registration of the entrance region in the second location information table can be omitted). Also, referring to the record of the "adjacent AS number=5 and the target IP address=198.51.100.0/24" in the attack information table 125 (example: FIG. 11), a total value 40 Gbps from Europe+10 Gbps from Asia=50 Gbps) of the amounts of communication directed to the target flowing in from the respective regions is calculated, and the total value is set as the value of the amount of communication directed to the target for the "adjacent AS number=5 and the target IP address=198.51.100.0/24" in the second location information table 127 (example: FIG. 13). Records for other "adjacent AS numbers of the origins of flow+target IP addresses" are also similarly registered in the second location information table 127 (example: FIG. 13).

S9) The DDoS handling device 100 searches for an optimal combination with which shortage of resources at each location can be solved from among combinations for handling each "adjacent AS of the origin of flow+target IP address (in units of /24)" using either the first location or the second location. Here, a method of deciding an optimal combination will be described for each of cases of the objective function 1 that maximally equalizes the resource utilization rates at the respective locations for the purpose not only of solving shortage of resources at the respective locations but of further enhancing containing efficiency and the objective function 2 that minimizes the number of communications directed to the target for which it is necessary to change a path from the current path in consideration of influences on the communication associated with a change in path in addition to the solving of the shortage of resources.

Case of Objective Function 1

In the case of the objective function 1, a resource utilization rate (=the amount of handling/the maximum amount of resources×100) at each location in a case in which one of all the "adjacent ASs of origins of flow+target IP addresses (in units of /24)" is the second location and the others are the first locations is calculated first, on the basis of the first location information table 126 (example: FIG. 12), the second location information table 127 (example: FIG. 13), and the correspondence information table 123 between each GW and a location (example: FIG. 9), and the maximum value thereof is held. In a case in which only "adjacent AS of the origin of flow=5 and the target IP address=198.51.100.0/24" is the second location, the amount handled at a North America location (location 1) is 10 Gbps, the amount handled at an Europe location (location 2) is 30 Gbps, the amount handled at an Asia location (location 3) is 50 Gbps, and the maximum value of the resource utilization rate is 50/60*100=83.3% at the location 3. The maximum value of the utilization value is similarly calculated for a case in which only the other "adjacent AS of the origin of flow+target IP address (in units of /24)" is the second location. Further, calculation is performed for all the cases, namely, in a case in which two of all the "adjacent ASs of the origins of flow+target IP addresses (in units of /24)" are the second locations and the other are the first locations, in a case in which three of them are the second locations and the other are the first locations, . . . , a combination of paths of the respective "adjacent ASs of the origins of flow+target IP address (in units of /24)" with which the maximum value of the resource utilization rates becomes minimum, thereby deciding an optimal combination for the objective function 1 (only the "adjacent AS of the origin of flow=6 and the target IP address=198.51.100.0/24" is the first location and the others are the second location; the maximum value of the resource utilization rates at this time=40/60*100=66.7%

Case of Objective Function 2

In the case of the objective function 2, a resource utilization rate at each location in a case in which one of all the "adjacent ASs of origins of flow+target IP addresses (in units of /24)" is the second location and the others are the first locations is calculated first on the basis of the first location information table 126 (example: FIG. 12), the second location information table 127 (example: FIG. 13), and the correspondence information table 123 between each GW and a location (example: FIG. 9), combinations with which the resource utilization ratios at all locations are equal to or less than 100% (or equal to or less than a threshold value or the like set for handling variations in the amount of attack; here, a case in which the searching is carried out under the condition that the resource utilization rates are equal to or less than 100% will be described) are extracted, and the combination that requires the smallest number of "adjacent ASs of the origins of flow+target IP addresses (in units of /24)" requiring a change from the current path (requiring switching of locations to be used) is extracted. This is carried out for all the cases, namely in a case in which two of all the "adjacent ASs of the origins of flow+target IP addresses units of /24)" are the second locations and the others are the first locations, in a case in which three of them are the second locations and the others are the first locations, . . . , and a combination of the smallest number of change in path is extracted, thereby deciding an optimal combination for the objective function 2. In a case in which only "adjacent AS of the origin of flow=5 and the target IP address=198.51.100.0/24" is the second location, for example, the amount handled at a North America location (location 1) is 10 Gbps, the amount handled at a Europe location (location 2) is 30 Gbps, the amount handled at an Asia location (location 3) is 50 Gbps, the condition of the resource utilization ratio is satisfied at all the locations at which the resource utilization rate is equal to or less than the maximum amount of resources (=60 Gbps), the number of change in path becomes the minimum value 1, and this is thus extracted as an optimal combination. In the case of objective function 2, it is also possible to shorten the calculation time by ending the search in a case in which a combination that satisfies the condition of the resource utilization rate and has the number of changes in path being the minimum value 1 is found in the process of full search.

Note that although the case in which the optimal combination is found through full search in the calculation of the objective function 1 and the objective function 2 are described, it is also possible to formulate the calculation as a combination integer planning problem as described above, and in such a case, it is also possible to more effectively obtain a solution than the full search using a branch and bound method, a cutting plane method, or the like.

The DDoS handling device 100 updates the path number and the entrance information of each "adjacent AS of the origin of flow+target IP address (in units of /24)" in the attack information table 125 (example: FIG. 11) on the basis of the result of the search after the search for the optimal combination is completed. At this time, the DDoS handling device 100 copies and stores, in the observation amount information table 128 (example: FIG. 14) at the time of the path of the first location, the current (the path when the first location is used) entrance information (the region and the amount of communication directed to the target) in the attack information table 125 (example: FIG. 11) for the "adjacent AS of the origin of flow+target IP address (in units of /24)" for which the current path is changed from the path (path number=1) when the first location is used to the path (path number=2) when the second location is used.

S10) The DDoS handling device 100 issues a BGP path advertisement for performing handling of drawing each "adjacent AS of the origin of flow+target IP address (in units of /24)" into the mitigation device 300 through a desired path, for the GWs and the packet transfer device 400.

In a case in which the path when the first location is used is switched to the path when the second location is used (example: the communication flows in from Asia) for the "adjacent AS of the origin of flow+target IP address (in units of /24)" that is being currently drawn into the mitigation device 300 in one example, the MED value of path information of the communication directed to the target IP address (/24) is set to a value that is smaller than the MED value of path information from an entrance GW in another region, and the BGP path is advertised, for a facing GW (eBGP peer) of the designated adjacent AS from the entrance GW in the Asia region. Also, in a case in which the path when the second location is used is switched to the path when the first location is used, a BGP path with the MED value of the path information of the communication directed to the target IP address (/24) that is set to the same value is issued for the facing GW (eBGP peer) of the designated adjacent AS from the entrance GWs in all the regions.

In addition to the aforementioned change in path in the adjacent AS, anycast routing, for example, is applied to the "adjacent AS of the origin of flow+target IP address (in units of /24)" that is newly drawn into the mitigation device 300, in the AS itself, and a BGP path advertisement for transferring the communication directed to the target IP address up to the mitigation location is issued for each GW and packet transfer device (iBGP peer) in the AS itself, thereby drawing the communication into the location corresponding to the entrance through which the communication flows in.

Note that in a case in which the locations used handle arbitrary communication directed to the target are switched by carrying out the traffic control in the AS itself, and in a case in which the path is switched to the one when the first location is used in the processing in S10), anycast routing is applied in the AS itself, and BGP path advertisement for transferring the communication directed to the target IP address up to the mitigation location is issued for each GW and packet transfer device (iBGP peer) in the AS itself. In a case in which the path is switched to the one when the second location is used, BGP path advertisement for transferring the communication directed to the target IP address up to the mitigation location on the exit side is issued for each GW and packet transfer device (iBGP peer) in the AS itself without applying the anycast routing in the AS itself, for example.

S11) The GW devices and the packet transfer device 400 change a path through transmission of path information to the adjacent AS and draw communication to the mitigation location for each "adjacent AS+target IP address".

S12) The DDoS handling device 100 then determines whether or not it is necessary to distribute a load again using a tinier or reception of an attack detection message as a trigger. Also, the DDoS determines to end the handling using the timer as a trigger.

Summary of Embodiment

As described above, the embodiment provides the DDoS handling device that handles, with the following features, communication directed to a target of a DDoS attack flowing in from at least one adjacent autonomous system in an autonomous system provided with a plurality of mitigating locations for the DDoS attack. According to the features, the autonomous system includes plurality of gateway devices that serve as a plurality of connection points to adjacent autonomous systems, the mitigating locations configured to mitigate the attack pertaining to the communication directed to the target flowing in are defined in advance for the respective gateway devices, and the DDoS handling device includes: a load distribution determination unit configured to determine whether or not to execute load distribution processing on the basis of an amount of available resources at mitigating locations corresponding to a gateway device into which the communication directed to the target flows and an amount of the communication directed to the target in a case in which at least one attack has been detected; a load distribution processing unit configured to decide mitigating locations to be used to handle the communication directed to the target from among the plurality of mitigating locations to solve shortage of resources at the mitigating locations for each attack, in a case in which the load distribution determination unit determines to execute the load distribution processing; and an attack handling setting unit configured to execute path control such that the communication directed to the target pertaining to the attack passes through the mitigating locations decided by the load distribution processing unit for each attack.

The load distribution processing unit decides the path for each attack not only to solve the shortage of resources at the mitigating locations but to maximally equalize resource utilization rates at the respective mitigating locations.

The load distribution processing unit may decide the path for each attack not only to solve the shortage of resources at the mitigating locations but to minimize the number of communications directed to the target requiring changes in path from a current path.

The mitigating locations used for the handling include a plurality of mitigating locations that are present on one or more paths through which the communication directed to the target can be transferred with comparable delays, for example. The plurality of mitigating locations may include a first location corresponding to a gateway device into which the communication directed to the target flows and a second location corresponding to a gateway device out of which the communication directed to the target flows.

The load distribution processing unit may be configured to create a first location information table storing an amount of communication directed to the target at each gateway device in a case in which the communication directed to the target pertaining to the attack passes through the first location, for each attack, and a second location information table storing an amount of communication directed to the target at gateway devices in a target region in a case in which the communication directed to the target pertaining to the attack passes through the second location, for each attack, and decide the mitigating locations used to handle the respective attacks on the basis of information in the first location information table and information in the second location information table.

The technology according to the present embodiment enables more DDoS attacks to be handled by distributing a resource load among locations while preventing an increase in delay in the communication directed to the target associated with the handling.

Although the embodiment has been described above, the present invention is not limited to such a specific embodiment, and various modifications and changes can be made within the scope of the gist of the present invention described in the claims.

REFERENCE SIGNS LIST

100 DDoS handling device
110 Processing unit
111 Attack detection message processing unit
112 Load distribution determination unit
113 Load distribution processing unit
114 Attack handling setting unit
115 Readjustment and handling end determination unit
120 Storage unit
121 Flow information table
122 Mitigation location information table
123 Correspondence information table for each G and location
124 Target IP address information table
125 Attack information table
126 First location information table for each attack
127 Second location information table for each attack
128 Observation amount information table at time of path of first location
130 Communication unit
150 Drive device
151 Recording medium
152 auxiliary storage device
153 Memory device
154 CPU
155 Interface device
156 Display device
157 Input device
200 Traffic information collection/DDoS attack detection device
300 Mitigation device
400 Packet transfer device

The invention claimed is:

1. A Distributed Denial of Service (DDoS) handling device configured to handle communication directed to a target of a DDoS attack flowing into one of a plurality of gateway devices of an autonomous system that serve as a plurality of connection points to adjacent autonomous systems and correspond to a plurality of mitigating locations for the DDoS attack, respectively, the DDoS handling device comprising:

a load distribution determination unit, including one or more processors, configured to determine whether or not to execute load distribution processing based on an amount of available resources at mitigating locations corresponding to the gateway device of the autonomous system into which the communication directed to the target flows and, if at least one attack has been detected, based further on an amount of the communication directed to the target;

a load distribution processing unit, including one or more processors, configured to select, from among the plurality of mitigating locations, mitigating locations to be used to handle the communication directed to the target to address shortages of resources between mitigating locations for each attack if the load distribution determination unit determines to execute the load distribution processing, wherein selecting the mitigation locations is performed to optimize a combination of (i) a first objective function that minimizes a difference between a maximum value and a minimum value of resource utilization rates at the respective mitigating locations and (ii) a second objective function that minimizes a number of communications directed to the target that is necessary to change from a current communication path; and an attack handling setting unit, including one or more processors, configured to execute path control such that the communication directed to the target passes through the mitigating locations selected by the load distribution processing unit for each attack.

2. The DDoS handling device according to claim 1, wherein the selected mitigating locations include a plurality of mitigating locations that are present on one or more paths through which the communication directed to the target can be transferred with delays comparable to those of the current communication path.

3. The DDoS handling device according to claim 1, wherein the plurality of mitigating locations include a first location corresponding to a gateway device of the autonomous system into which the communication directed to the target flows and a second location corresponding to a gateway device of the autonomous system out of which the communication directed to the target flows.

4. The DDoS handling device according to claim 3, wherein the load distribution processing unit is configured to create a first location information table storing information for each attack indicating an amount of communication directed to the target at each gateway device, and a second location information table storing information for each attack indicating an amount of communication directed to the target at gateway devices in a target region, and select mitigating locations to be used to handle each attack based on information in the first location information table and information in the second location information table.

5. A Distributed Denial of Service (DDoS) handling method that is executed by a DDoS handling device configured to handle communication directed to a target of a DDoS attack flowing into one of a plurality of gateway devices of an autonomous system that serve as a plurality of connection points to adjacent autonomous systems and correspond to a plurality of mitigating locations for the DDoS attack, respectively, the DDoS handling method comprising:

determining whether or not to execute load distribution processing based on an amount of available resources at mitigating locations corresponding to the gateway device of the autonomous system into which the communication directed to the target flows and, if at least one attack has been detected, based further on an amount of the communication directed to the target;

selecting, from among the plurality of mitigating locations, mitigating locations to be used to handle the communication directed to the target to address shortages of resources between mitigating locations for each attack if it is determined to execute the load distribution processing, wherein selecting the mitigation locations is performed to optimize a combination of (i) a first objective function that minimizes a difference between a maximum value and a minimum value of resource utilization rates at the respective mitigating locations and (ii) a second objective function that minimizes a number of communications directed to the target that is necessary to change from a current communication path; and executing path control such that the communication directed to the target passes through the mitigating locations selected for each attack.

6. The DDoS method according to claim 5, wherein selecting mitigating locations for each attack comprises selecting a plurality of mitigating locations that are present on one or more paths through which the communication directed to the target can be transferred with delays comparable to those of the current communication path.

7. The DDoS method according to claim 5, wherein the plurality of mitigating locations include a first location corresponding to a gateway device of the autonomous system into which the communication directed to the target flows and a second location corresponding to a gateway device of the autonomous system out of which the communication directed to the target flows.

8. The DDoS method according to claim 7 further comprising:

creating a first location information table storing information for each attack indicating an amount of communication directed to the target at each gateway device, and a second location information table storing information for each attack indicating an amount of communication directed to the target at gateway devices in a target region, and wherein selecting mitigating locations for each attack comprises selecting mitigating locations for each attack based on information in the first location information table and information in the second location information table.

9. A non-transitory computer readable storage medium storing instructions that when executed by a computer cause the computer to perform a Distributed Denial of Service (DDoS) handling method that is executed by a DDoS handling device configured to handle communication directed to a target of a DDoS attack flowing into one of a plurality of gateway devices of an autonomous system that serve as a plurality of connection points to adjacent autonomous systems and correspond to a plurality of mitigating locations for the DDoS attack, respectively, the DDoS handling method comprising:

determining whether or not to execute load distribution processing based on an amount of available resources at mitigating locations corresponding to the gateway device of the autonomous system into which the communication directed to the target flows and, if at least one attack has been detected, based further on an amount of the communication directed to the target;

selecting, from among the plurality of mitigating locations, mitigating locations to be used to handle the communication directed to the target to address shortages of resources between mitigating locations for each attack if it is determined to execute the load distribution processing, wherein selecting the mitigation locations is performed to optimize a combination of (i) a first objective function that minimizes a difference between a maximum value and a minimum value of resource utilization rates at the respective mitigating locations and (ii) a second objective function that minimizes a number of communications directed to the target that is necessary to change from a current communication path; and executing path control such that the communication directed to the target passes through the mitigating locations selected for each attack.

10. The non-transitory computer readable storage medium according to claim 9, wherein selecting mitigating locations for each attack comprises wherein selecting a plurality of mitigating locations that are present on one or more paths through which the communication directed to the target can be transferred with delays comparable to those of the current communication path.

11. The non-transitory computer readable storage medium according to claim 9, wherein the plurality of mitigating locations include a first location corresponding to a gateway device of the autonomous system into which the communication directed to the target flows and a second location corresponding to a gateway device of the autonomous system out of which the communication directed to the target flows.

12. The non-transitory computer readable storage medium according to claim 11, wherein the DDoS handling method further comprises:

creating a first location information table storing information for each attack indicating an amount of communication directed to the target at each gateway device, and a second location information table storing information for each attack indicating an amount of communication directed to the target at gateway devices in a target region, and wherein selecting mitigating locations for each attack comprises selecting mitigating locations for each attack based on information in the first location information table and information in the second location information table.

* * * * *